(12) United States Patent
Toyama et al.

(10) Patent No.: US 7,863,614 B2
(45) Date of Patent: *Jan. 4, 2011

(54) LED BACKLIGHT DEVICE AND LCD DEVICE

(75) Inventors: Hiroshi Toyama, Tokyo (JP); Yukio Nakamura, Tokyo (JP)

(73) Assignee: Oki Data Corporation, Tokyo (JP)

( * ) Notice: Subject to any disclaimer, the term of this patent is extended or adjusted under 35 U.S.C. 154(b) by 170 days.

This patent is subject to a terminal disclaimer.

(21) Appl. No.: 12/230,229

(22) Filed: Aug. 26, 2008

(65) Prior Publication Data

US 2009/0073350 A1    Mar. 19, 2009

(30) Foreign Application Priority Data

Sep. 18, 2007    (JP)    ............... 2007-240423

(51) Int. Cl.
*H01L 29/04* (2006.01)

(52) U.S. Cl. ............... 257/59; 257/72; 257/79; 257/E33.001; 349/69

(58) Field of Classification Search ............ 257/52, 257/59, 72, 79–82, 98, 101, 103, E51.018; 362/612–613, 97.3; 349/69; 315/169.3
See application file for complete search history.

(56) References Cited

U.S. PATENT DOCUMENTS

| 5,813,753 | A | 9/1998 | Vriens et al. | |
|---|---|---|---|---|
| 7,006,172 | B2 * | 2/2006 | Kawana et al. | 349/71 |
| 7,481,563 | B2 | 1/2009 | David et al. | |
| 2003/0026096 | A1 | 2/2003 | Ellens et al. | |
| 2004/0021629 | A1 | 2/2004 | Sasuga et al. | |
| 2006/0158581 | A1 | 7/2006 | Komoto et al. | |

(Continued)

FOREIGN PATENT DOCUMENTS

EP    1385215 A2    1/2004

(Continued)

OTHER PUBLICATIONS

Akihiko Murai et al., "Hexagonal pyramid shaped light-emitting diodes based on ZnO and GaN direct wafer bonding", Applied Physics Letters 89. 171116 (2006), p. 171116-1 to 171116-3.

(Continued)

*Primary Examiner*—Davienne Monbleau
*Assistant Examiner*—Hoa B Trinh
(74) *Attorney, Agent, or Firm*—Rabin & Berdo, P.C.

(57) ABSTRACT

An LED backlight device includes a first substrate having optical transparency and having first and second surfaces. An LED thin-film layered structure is fixed to the first surface of the first substrate, and is formed of epitaxially grown inorganic material layers as a P-N junction device. An anode electrode of the LED thin-film layered structure is connected to an anode driver IC via an anode wiring. A cathode electrode of the LED thin-film layered structure is connected to a cathode driver IC via a cathode wiring. A phosphor is provided on the second surface of the first substrate. The LED backlight device further includes a second substrate having optical transparency and having first and second surfaces. The first surface of the second substrate faces the first surface of the first substrate. A reflection layer is provided on the second surface of the second substrate.

25 Claims, 15 Drawing Sheets

U.S. PATENT DOCUMENTS

2007/0080626 A1* 4/2007 Son et al. .................. 313/499

FOREIGN PATENT DOCUMENTS

| EP | 1521235 | A2 | 4/2005 |
|----|---------|----|--------|
| JP | 09232198 | A | 9/1997 |
| JP | 11-232920 | | 8/1999 |
| JP | 2000133006 | A | 5/2000 |
| JP | 2003068109 | A | 3/2003 |
| JP | 2004119634 | A | 4/2004 |
| JP | 2005051117 | A | 2/2005 |
| JP | 2005079369 | A | 3/2005 |
| JP | 2005093649 | A | 4/2005 |
| JP | 2005150703 | A | 6/2005 |
| JP | 2006244779 | A | 9/2006 |
| JP | 2006261218 | A | 9/2006 |
| JP | 2006308858 | A | 11/2006 |
| WO | WO-97/48138 | A2 | 12/1997 |
| WO | WO-2006/076210 | A2 | 7/2006 |

OTHER PUBLICATIONS

Po-Chun Liu et al., "Wafer bonding for high-brightness light-emitting diodes via indium tin oxide intermediate layers", Thin Solid Films 478 (2005) 280-285.

* cited by examiner

LED BACKLIGHT DEVICE AND LCD DEVICE

BACKGROUND OF THE INVENTION

This invention relates to an LED backlight device and an LCD device having the LED backlight device.

A general LCD (Liquid Crystal Display) device is configured to irradiate an LCD panel with a light emitted by a light source, and to change alignments of liquid crystals arranged on the LCD panel so as to display an image using the light passing through the LCD panel.

The light source used in such an LCD device is called as a backlight, since the light source is disposed on a backside of the LCD panel (i.e., a side opposite to a display surface of the LCD panel). The conventional light source is composed of a cold cathode ray tube or a semiconductor light emitting element. The light source using the semiconductor light emitting element has been broadly used, since such a light source has a long lifetime and contributes to reduction of power consumption.

In this regard, there is known a conventional surface-emitting light source using an LED (Light Emitting Diode) as the above described semiconductor light emitting element, and a plate-like member called as a light guiding plate (or a light diffusion plate) for guiding the light emitted by the LED. The light emitted by the LED is incident on an end surface of the light guiding plate, and reflected and diffused in the direction perpendicular to a surface of the light guiding plate (see, Japanese Laid-Open Patent Publication No. 11-232920).

However, in the conventional backlight device, the light diffused in the light guiding plate tends to attenuate due to the reflection and diffusion, as a distance from the incident surface (i.e., the end surface of the light guiding plate) increases. Therefore, in order to obtain a high light intensity uniformly over the entire surface, the structure of the light guiding plate needs to be complicated, and the LED backlight device needs to be thick.

SUMMARY OF THE INVENTION

The present invention is intended to solve the above described problems, and an object of the present invention is to provide an LED backlight device which is thin and provides a high light intensity, and an LCD device using such an LED backlight device.

The present invention provides an LED backlight device including a first substrate having optical transparency and having a first surface and a second surface opposite to the first surface. An LED thin-film layered structure is fixed to the first surface of the first substrate. The LED thin-film layered structure is formed of epitaxially grown inorganic material layers as a P-N junction device. An anode electrode and a cathode electrode are provided on the LED thin-film layered structure. An anode driver IC and a cathode driver IC are provided for driving the LED thin-film layered structure. An anode wiring is provided on the first surface of the first substrate for electrically connecting the anode driver IC and the anode electrode of the LED thin-film layered structure. A cathode wiring is provided on the first surface of the first substrate for electrically connecting the cathode driver IC and the cathode electrode of the LED thin-film layered structure. A phosphor is provided on the second surface of the first substrate. A second substrate has optical transparency and has a first surface and a second surface opposite to the first surface. The first surface of the second substrate faces the first surface of the first substrate. A reflection layer is provided on the second surface of the second substrate.

With such a configuration, the thickness of the LED backlight device can be reduced, and the light intensity of the LED backlight device can be increased.

The present invention also provides an LED backlight device including a first substrate having optical transparency and having a first surface and a second surface opposite to the first surface. An LED thin-film layered structure is fixed to the first surface of the first substrate. The LED thin-film layered structure is formed of epitaxially grown inorganic material layers as a P-N junction device. An anode electrode and a cathode electrode are provided on the LED thin-film layered structure. An anode driver IC and a cathode driver IC are provided for driving the LED thin-film layered structure. An anode wiring is provided on the first surface of the first substrate for electrically connecting the anode driver IC and the anode electrode of the LED thin-film layered structure. A cathode wiring is provided on the first surface of the first substrate for electrically connecting the cathode driver IC and the cathode electrode of the LED thin-film layered structure. A phosphor is provided on the second surface of the first substrate. A second substrate has a first surface and a second surface opposite to the first surface. The first surface of the second substrate faces the first surface of the first substrate. A protrusion is provided on the first surface of the second substrate so as to face a position on the first surface of the first substrate apart from the LED thin-film layered structure by a certain distance. The protrusion has an inclined surface. A reflection layer is provided to cover the first surface of the second substrate and the protrusion.

The present invention also provides an LED backlight device including a first substrate having optical transparency and having a first surface and a second surface opposite to the first surface. An LED thin-film layered structure is fixed to the first surface of the first substrate. The LED thin-film layered structure is formed of epitaxially grown inorganic material layers as a P-N junction device. An anode electrode and a cathode electrode are provided on the LED thin-film layered structure. An anode driver IC and a cathode driver IC are provided for driving the LED thin-film layered structure. An anode wiring is provided on the first surface of the first substrate for electrically connecting the anode driver IC and the anode electrode of the LED thin-film layered structure. A cathode wiring is provided on the first surface of the first substrate for electrically connecting the cathode driver IC and the cathode electrode of the LED thin-film layered structure. A protrusion is provided on a position on the first surface of the first substrate apart from the LED thin-film layered structure by a certain distance. The protrusion has an inclined surface. A phosphor is provided on the second surface of the first substrate. A second substrate has optical transparency and has a first surface and a second surface opposite to the first surface. The first surface of the second substrate faces the first surface of the first substrate. A reflection layer is provided on the second surface of the second substrate.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENT

Hereinafter, an embodiment of the present invention will be described with reference to the attached drawings.

First Embodiment

Figure 1:
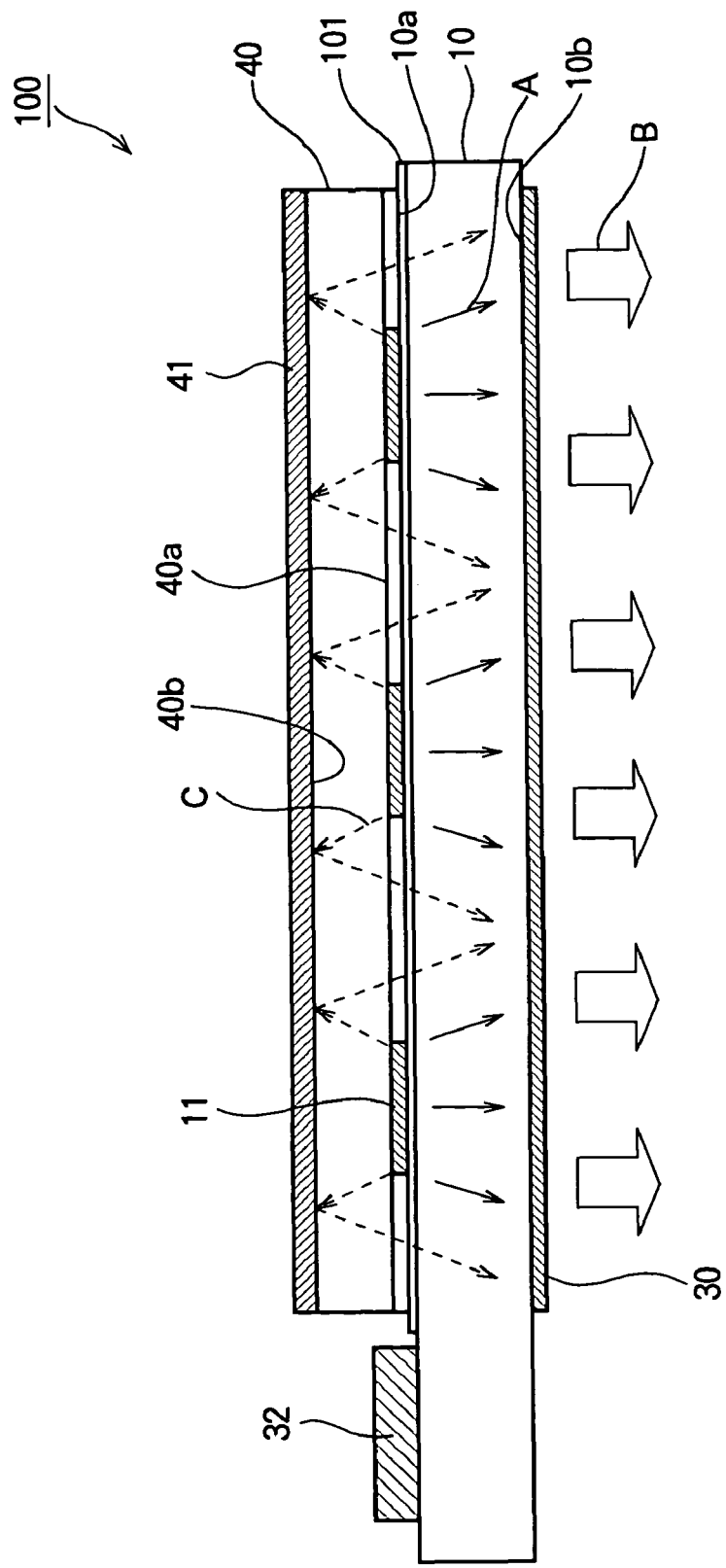
FIG. 1 is a side sectional view showing an LED backlight device according to the first embodiment of the present invention.
Figure 2:
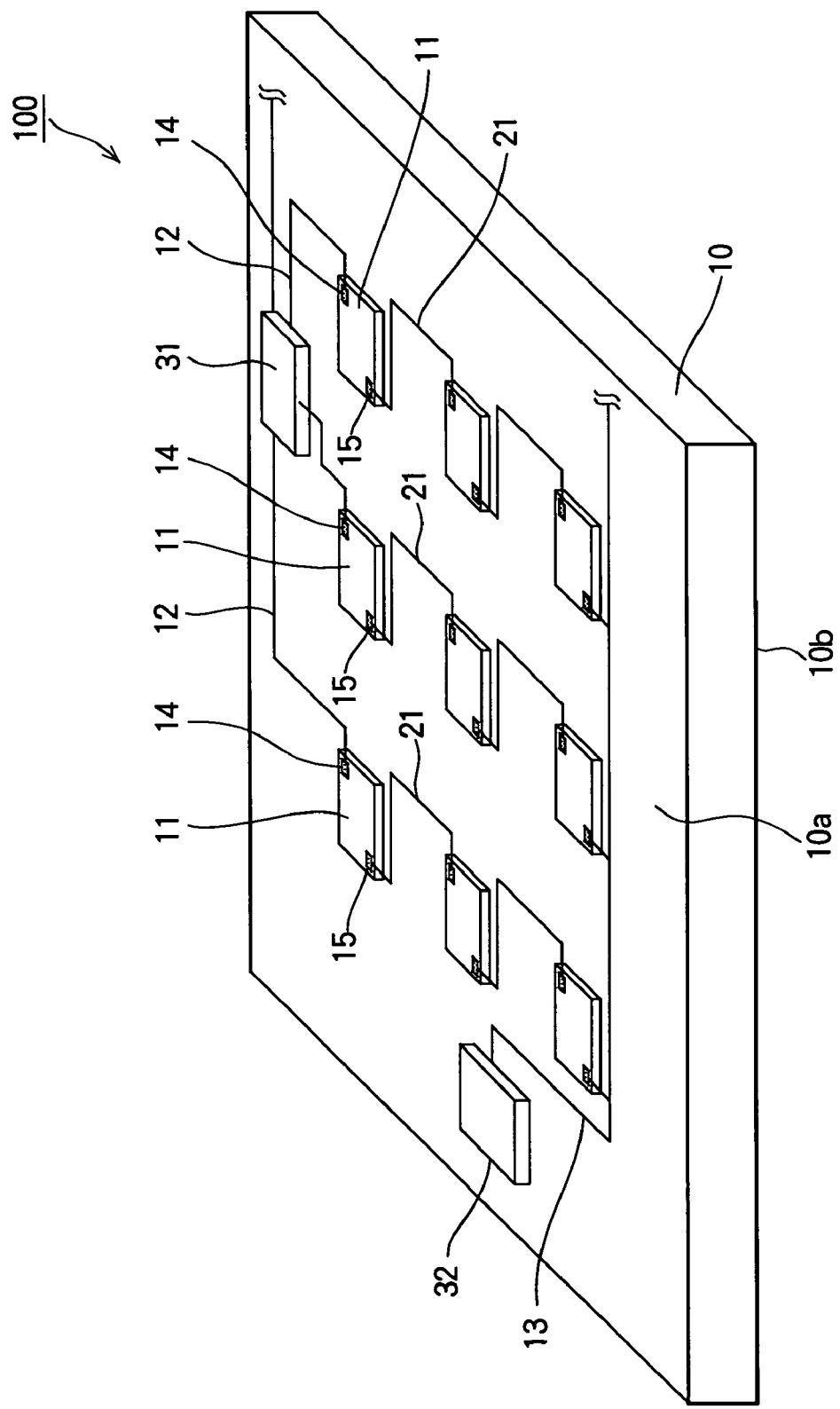
FIG. 2 is a perspective view showing a first substrate of the LED backlight device according to the first embodiment of the present invention, as seen from a first surface side thereof.
Figure 3:
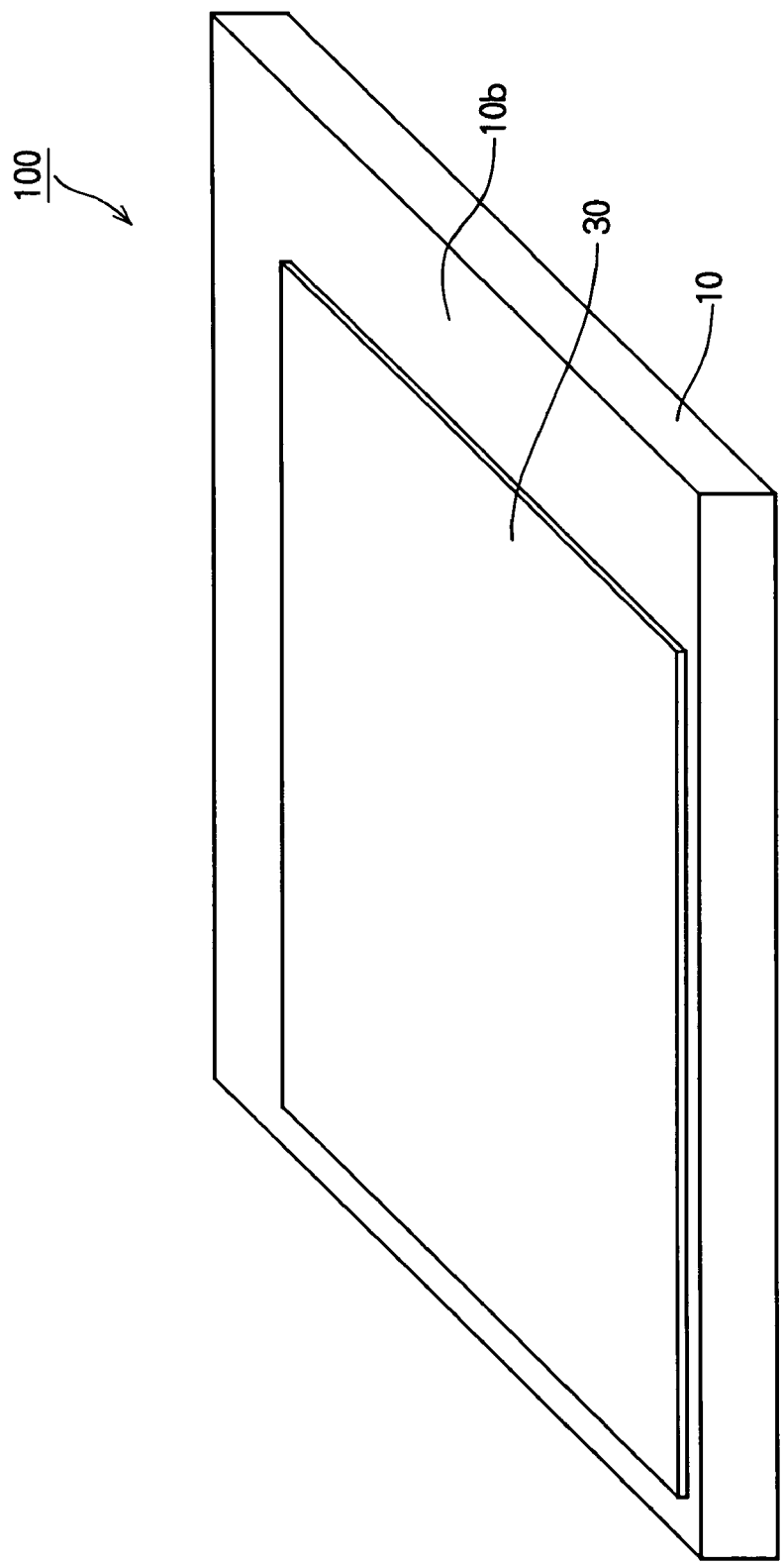
FIG. 3 is a perspective view showing the first substrate of the LED backlight device according to the first embodiment of the present invention, as seen from a second surface side thereof.
Figure 4:
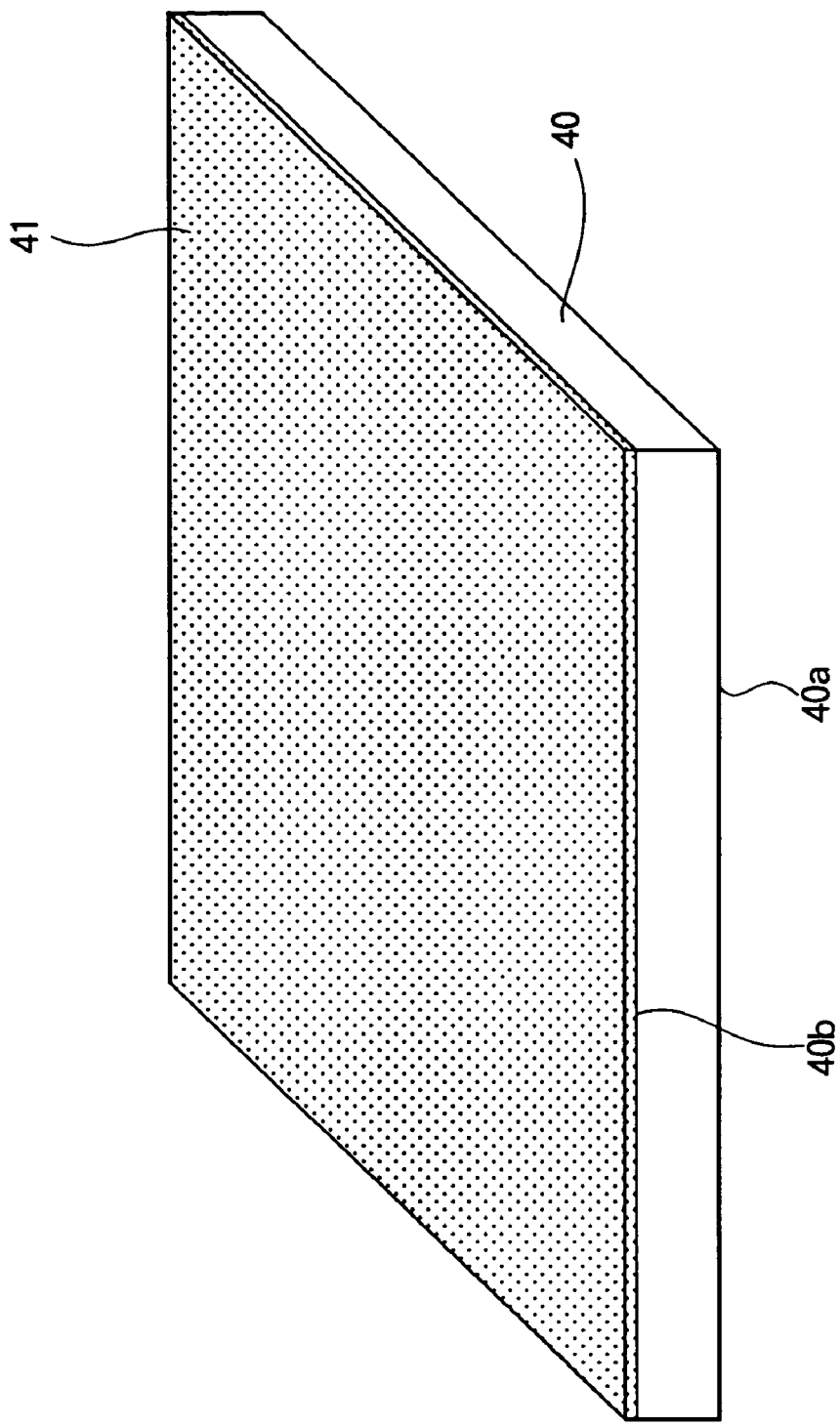
FIG. 4 is a perspective view showing a second substrate of the LED backlight device according to the first embodiment of the present invention, as seen from a second surface side thereof.
Figure 5:
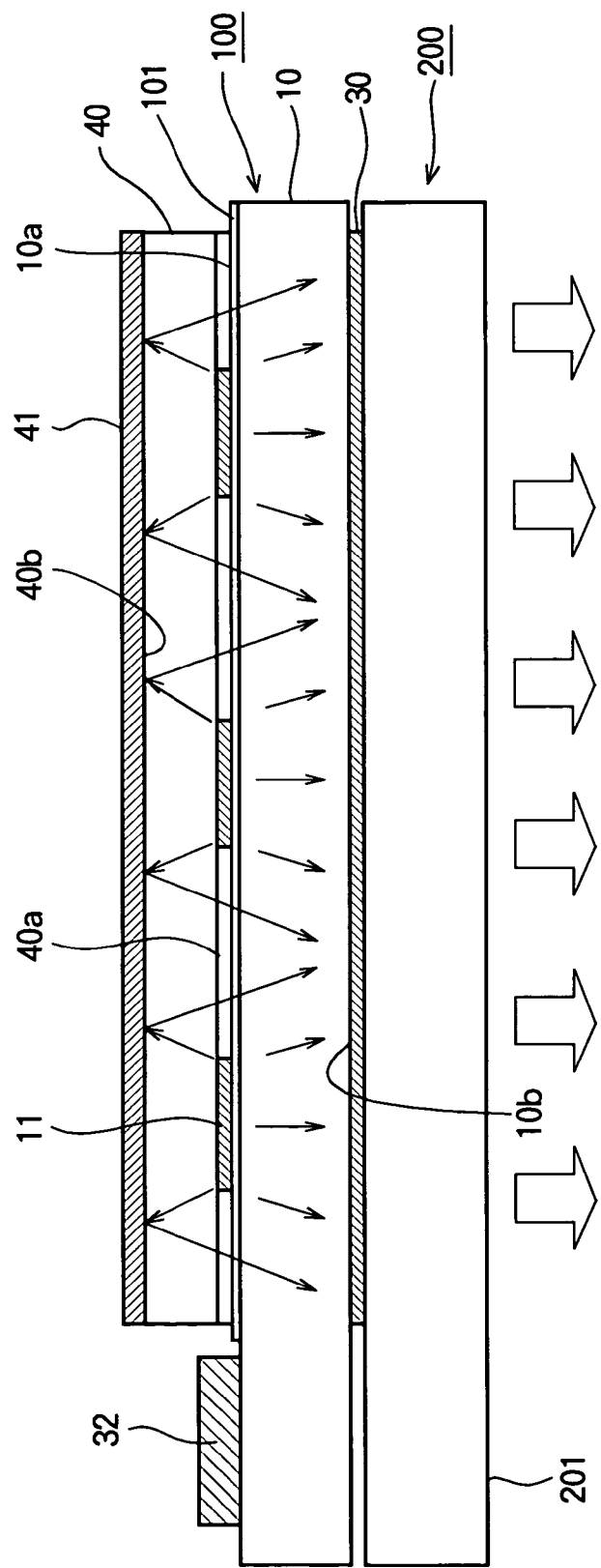
FIG. 5 is a side sectional view showing an LCD device using the LED backlight device according to the first embodiment of the present invention.

FIG. 1 is a side sectional view showing an LED backlight device according to the first embodiment of the present invention. FIG. 2 is a perspective view showing a first substrate of the LED backlight device according to the first embodiment of the present invention, as seen from a first surface side thereof. FIG. 3 is a perspective view showing the first substrate of the LED backlight device according to the first embodiment of the present invention, as seen from a second surface side thereof. FIG. 4 is a perspective view showing a second substrate of the LED backlight device according to the first embodiment of the present invention, as seen from a second surface side thereof. FIG. 5 is a side sectional view showing an LCD device using the LED backlight device according to the first embodiment of the present invention.

As shown in FIG. 5, an LED backlight device 100 and an LCD panel 200 constitute an LCD device according to this embodiment. The LED backlight device 100 is disposed on a backside of the LCD panel 200 having a display surface 201 on a front side, and functions as a light source.

The LED backlight device 100 includes a substrate 10 (i.e., a first substrate) in the form of a flat plate. The substrate 10 has a first surface 10a (i.e., an upper surface in FIG. 1) and a second surface 10b (i.e., a lower surface in FIG. 1). LEDs 11 (i.e., LED thin-film layered structures) are fixed to the first surface 10a of the substrate 10. A phosphor 30 is fixed to the second surface 10b of the substrate 10.

Further, the LED backlight device 100 includes a substrate 40 (i.e., a second substrate) in the form of a flat plate. The substrate 40 has a first surface 40a (i.e., a lower surface in FIG. 1) that faces the substrate 10 and a second surface 40b (i.e., an upper surface in FIG. 1). A reflection layer 41 is fixed to the second surface 40b of the substrate 40 so that the reflection layer 41 entirely covers the second surface 40b as shown in FIG. 4. The first surface 10a of the substrate 10 and the first surface 40a of the substrate 40 face each other. A plurality of LEDs 11 are arranged in an array on the first surface 10a of the substrate 10 as shown in FIG. 2. The number and arranging manner of the LEDs 11 can be determined arbitrarily. Here, LEDs 11 are described so that 9 LEDs 11 are arranged in a square grid having three rows and three columns, for convenience of illustration.

As shown in FIG. 2, an anode driver IC 31 and a cathode driver IC 32 for driving the LEDs 11 are disposed on the first surface 10a of the substrate 10. The anode driver IC 31 is connected to ends of lines of the anode wiring 12 connected to the anode electrodes 14 of the endmost LEDs 11 closest to the anode driver IC 31 of the respective columns. The cathode driver IC 32 is connected to an end of the cathode wiring 13 connected to the cathode electrodes 15 of the endmost LEDs 11 farthest from the anode driver IC 31 of the respective columns. Further, in each column, the anode electrodes 14 and the cathode electrodes 15 of the adjacent LEDs 11 are connected to each other by interconnection wirings 21. In other words, the LEDs 11 of each column are connected in series via the interconnection wirings 21, and the anode electrode 14 of the endmost LED 11 in each column and the cathode electrode 15 of the endmost LED 11 in each column are respectively connected to the anode driver IC 31 and the cathode driver IC 32 via the anode wiring 12 and the cathode wiring 13.

The substrates 10 and 40 are formed of quarts plate or glass plate having optical transparency, or resin plate (composed of, for example, acrylic resin) having optical transparency. The reflection layer 41 is composed of material reflecting near-ultraviolet rays or ultraviolet rays such as metal film (for example, aluminum) or multilayered reflection film formed using vacuum deposition method, plating method or the like. The phosphor 30 emits white light when exposed to near-ultraviolet rays or ultraviolet rays. The phosphor 30 is coated on the second surface 10b of the substrate 10 as shown in FIG. 3.

The phosphor 30 can be formed by mixing a phosphor that emits red light when exposed to near-ultraviolet rays or ultraviolet rays, a phosphor that emits green light when exposed to near-ultraviolet rays or ultraviolet rays and a phosphor that emits blue light when exposed to near-ultraviolet rays or ultraviolet rays. To be more specific, the phosphor that emits red light is, for example, $Y_2O_2$:Eu or (Y, Gd) $BO_3$:Eu. The phosphor that emits green light is, for example, $LaPO_4$:Ce, Tb or $Zn_2SiO$:Mn. The phosphor that emits blue light is, for example, (Sr, Ca, Ba, $Mg)_5(PO_4)_3Cl$:Eu or $BaMgAl_{10}O_{17}$:Eu. These phosphor materials are dispersed in a sealant composed of silicone-based resin having optical transparency, and the resultant material is coated and dried, so that the phosphor 30 is obtained.

The phosphor that emits red light is not limited the above described material, but can be composed of any kind of material that emits light having the wavelength in the range from 620 nm to 710 nm when exposed to near-ultraviolet rays or ultraviolet rays having the wavelength in the range from 300 nm to 450 nm. The phosphor that emits green light can be composed of any kind of material that emits light having the wavelength in the range from 500 nm to 580 nm when exposed to near-ultraviolet rays or ultraviolet rays having the wavelength in the range from 300 nm to 450 nm. The phosphor that emits blue light can be composed of any kind of material that emits light having the wavelength in the range from 450 nm to 500 nm when exposed to near-ultraviolet rays or ultraviolet rays having the wavelength in the range from 300 nm to 450 nm. Further, the material and coating method of the phosphor 30 can be arbitrary and suitably selected in accordance with the configuration of the phosphor 30, and are not limited to the above described material and coating method.

As shown in FIG. 1, the substrate 10 has a surface layer 101 (having optical transparency) forming the first surface 10a, and the surface layer 101 is formed of organic insulation film (such as polyimide film or the like) or an inorganic insulation film. The surface layer 101 is planarized to a surface accuracy less than or equal to several tens of nanometers. The LEDs 11 are peeled off from another substrate (i.e., a base material) as described later, and are fixed to the surface layer 101 of the substrate 10 by means of intermolecular force such as hydrogen bonding, so that the LEDs 11 are integrated with the substrate 10. The surface layer 101 is shown in side sectional view only, and omitted in other figures.

Each of the LEDs 11 is a thin-film LED that emits near-ultraviolet rays or ultraviolet rays, and is composed of a thin-film layered structure having a heterostructure or a double-heterostructure formed by epitaxially growing inorganic material such as gallium nitride, gallium indium nitride, aluminum gallium nitride, aluminum nitride or the like. The LED 11 is not limited to the above described material, but can be composed of any kind of material that emits near-ultraviolet rays or ultraviolet rays, more preferably, the light having the wavelength in the range from 300 to 450 nm.

The LEDs 11 and the phosphor 30 are respectively formed on the first and second surfaces 10a and 10b of the substrate 10 so that the LEDs 11 and the phosphor 30 face each other. Further, the LEDs 11 and the reflection layer 41 are respectively formed on the first surface 10a of the substrate 10 and the second surface 30a of the substrate 40 so that the LEDs 11 and the reflection layer 41 face each other.

With such an arrangement, the phosphor 30 and the reflection layer 41 are disposed so as to face each other on both sides of the LEDs 11 via the substrates 10 and 40. Therefore, near-ultraviolet rays or ultraviolet rays emitted by the LEDs 11 in the direction toward the substrate 10 are incident on the phosphor 30 as shown by arrows A in FIG. 1. Near-ultraviolet rays or ultraviolet rays emitted by the LEDs 11 in the direction toward the substrate 40 are reflected by the reflection layer 41 as shown by arrows C in FIG. 1, and are incident on the phosphor 30.

Therefore, when the LEDs 11 emit near-ultraviolet rays or ultraviolet rays having the wavelength in the range from 300 to 450 nm, the phosphor 30 (facing the LEDs 11 and the reflection layer 41) is irradiated with near-ultraviolet rays or ultraviolet rays directly proceeding from the LEDs 11 and reflected by the reflection film 41, and the phosphor 30 emits white light as shown by arrows B in FIG. 1.

The anode electrode 14 and the cathode electrode 15 are metal electrodes composed of gold, aluminum, or layered metal electrodes composed of gold or aluminum layered with nickel, titan or the like. The anode electrode 14 and the cathode electrode 15 are respectively connected to an anode and a cathode of each LED 11.

The anode wiring 12 and the cathode wiring 13 are metal wirings composed of gold, aluminum, or layered metal wirings composed of gold or aluminum layered with nickel, titan or the like. The anode wiring 12 and the cathode wiring 13 are respectively connected to the anode electrodes 14 and the cathode electrodes 15 of the LEDs 11. An end of the anode wiring 12 is connected to the anode driver IC 31, and an end of the cathode wiring 13 is connected to the cathode driver IC 32, so that the anode electrodes 14 and the cathode electrodes 15 of the LEDs 11 are connected to the anode driver IC 31 and the cathode driver IC 32 via the anode wiring 12 and the cathode wiring 13.

The anode driver IC 31 has a function to supply electric current to the LEDs 11 according to a lighting signal. In the anode driver IC 31, for example, a shift register circuit, a latch circuit, a constant current circuit, an amplifier circuit and the like are integrated. The anode wiring 12 is connected to the anode electrodes 14 of the LEDs 11 and is also connected to a driving element of the anode driver IC 31. Although the anode driver IC 31 is mounted on the substrate 10 in the example shown in FIG. 2, the anode driver IC 31 is not necessarily mounted on the substrate 10, but can be provided on other print circuit board (not shown) or the like.

The cathode driver IC 32 has a function to allow the electric current to flow therein from the LEDs 11. In the cathode driver IC 32, switching circuits such as transistor or the like are integrated. The cathode wiring 13 is connected to the cathode electrodes 15 of the LEDs 11 and is also connected to the cathode driver IC 32. The cathode driver IC 32 is not necessarily provided on the substrate 10, but can be provided on other print circuit board (not shown) or the like.

Next, a process for forming the LEDs 11 will be described.

Figure 6:
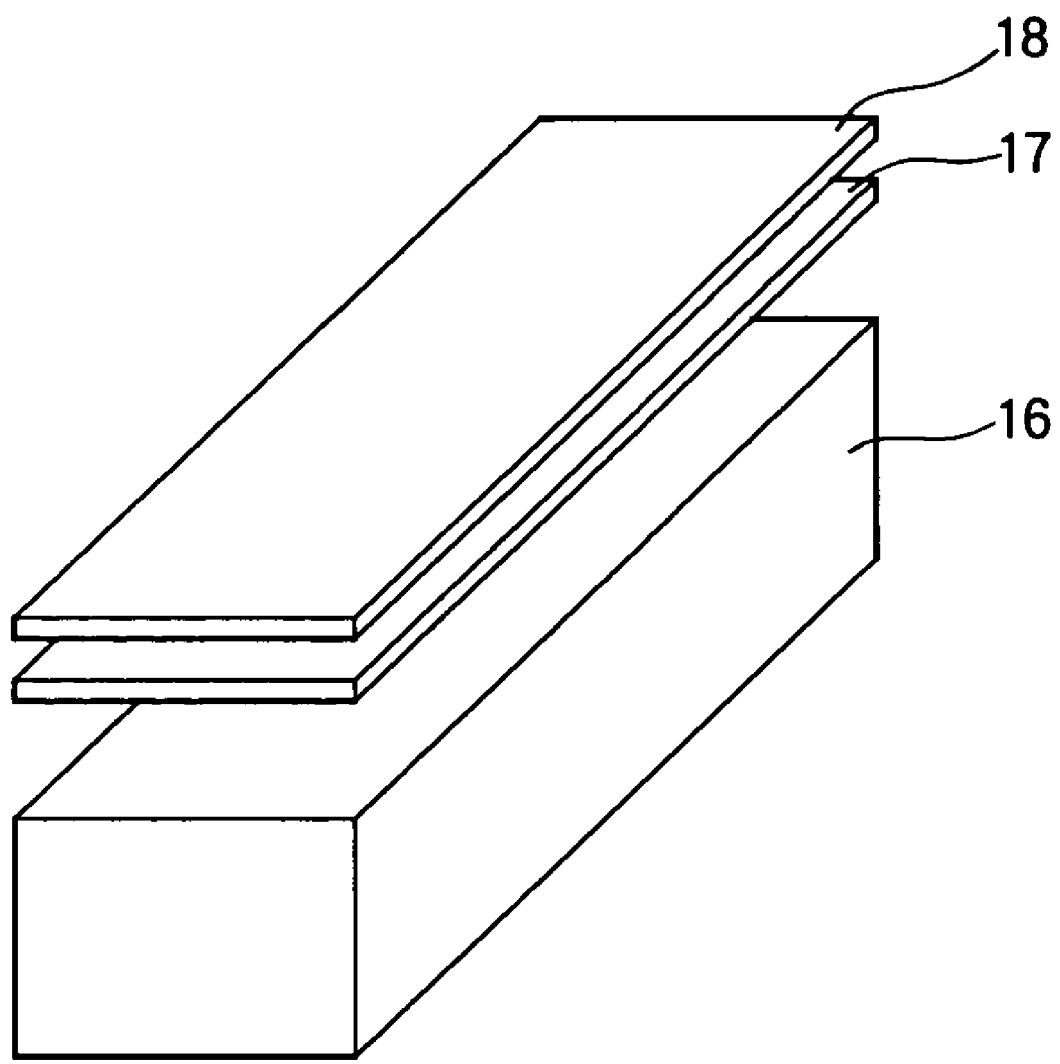
FIG. 6 is a schematic view showing a process for peeling an LED thin-film layered structure according to the first embodiment of the present invention.
Figure 7:
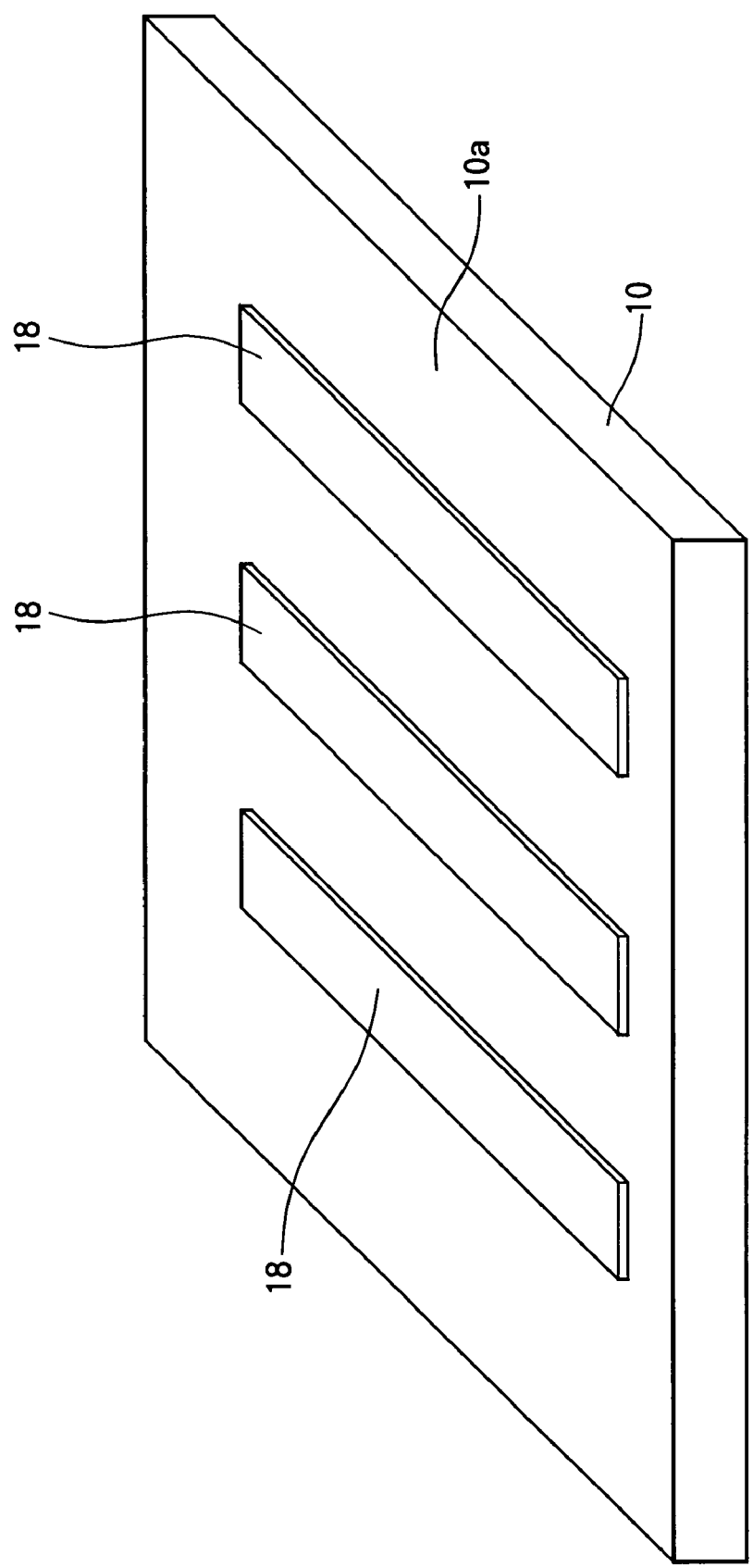
FIG. 7 is a schematic view showing a process for fixing the LED thin-film layered structure to a surface of a substrate according to the first embodiment of the present invention.
Figure 8:
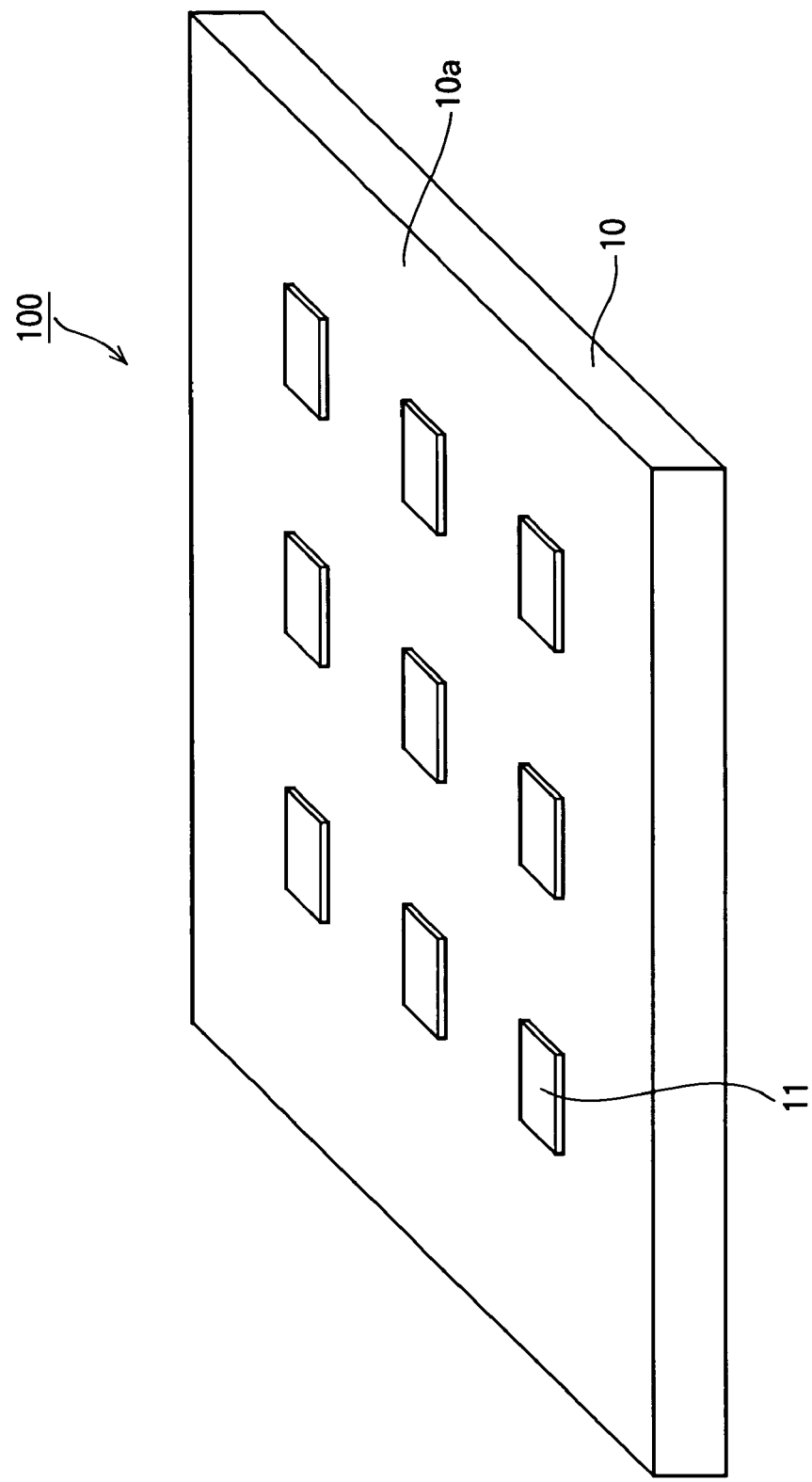
FIG. 8 is a schematic view showing a process for dividing the LED thin-film layered structure into a plurality of LEDs according to the first embodiment.

FIG. 6 shows a process for peeling a thin-film layered structure (the LEDs 11) according to the first embodiment of the present invention. FIG. 7 shows a process for fixing the thin-film layered structure (the LED 11) to the substrate according to the first embodiment of the present invention. FIG. 8 shows a process for dividing the thin-film layered structure into a plurality of LEDs 11 according to the first embodiment of the present invention.

In FIG. 6, reference numeral 18 indicates an elongated band-shaped (or strip-shaped) thin-film layered structure 18. The thin-film layered structure 18 is fixed to the substrate 10 and is divided into a plurality of LEDs 11 as described later. The thin-film layered structure 18 emits near-ultraviolet rays or ultraviolet rays, and has heterostructure or double-heterostructure composed of a plurality of layers such as gallium nitride or indium gallium nitride, aluminum gallium nitride, aluminum nitride or the like.

A sacrificial layer 17 is formed between a base material 16 and the thin-film layered structure 18 for peeling (i.e., separating) the thin-film layered structure 18 from the base material 16. The sacrificial layer 17 is composed of material such as, for example, aluminum arsenide that can easily be etched by an etching solution described later.

The base material 16 is composed of, for example, gallium arsenide, gallium nitride, sapphire or the like. Inorganic material layers (for forming thin-film layered structure 18) are epitaxially grown on the base material 16 using a vapor-phase growth method such as an MOCVD method.

Next, a process for peeling the epitaxially grown thin-film layered structure 18 from the base material 16 will be described.

If each LED 11 is designed to have, for example, a square shape having each side of 2 mm in length, each thin-film layered structure 18 is formed to have a band-shape having a width greater than or equal to 2 mm and a length greater than or equal to the column of LED array (i.e., the column including 3 LEDs 11). In this case, the thin-film layered structure 18 is formed in a band-shape on the base material 16 using an etching solution such as a solution containing phosphoric acid, hydrogen peroxide and water ($H_3PO_4:H_2O_2:H_2O$) or the like, by means of photolithographic etching technique broadly used in a semiconductor manufacturing process.

Next, the base material 16 on which the thin-film layered structure 18 is formed is immersed in an etching solution such as hydrogen-fluoride solution, hydrochloric solution or the like. With this, the sacrificial layer 17 is etched, and the thin-film layered structure 18 is peeled off from the base material 16.

Then, the thin-film layered structure 18 (having been peeled off from the base material 16) is pressed against the planarized first surface 10a of the substrate 10. The substrate 10 and the thin-film layered structure 18 are fixed to each other by means of intermolecular force and integrated with each other.

The substrate 10 has the surface layer 101 (the first surface 10a) shown in FIG. 1 formed of an organic insulation film such as polyimide film or an inorganic insulation film such as silicon oxide firm, and whose surface accuracy is less than or equal to several tens of nanometers having no concaves or convexes. Since the surface layer 101 of the substrate 10 has such a flat surface having no concave or convex, the bonding between the thin-film layered structure 18 and the substrate 10 by means of intermolecular force (such as hydrogen bonding or the like) can be facilitated.

By repeating this process, a plurality of (for example, three) thin-film layered structures 18 are fixed to and integrated with the first surface 10a of the substrate 10 as shown in FIG. 7.

Then, the thin-film layered structures 18 fixed to the first surface 10a of the substrate 10 are divided into a plurality of LEDs 11 using an etching solution such as a solution containing phosphoric acid, hydrogen peroxide and water ($H_3PO_4:H_2O_2:H_2O$) or the like. In this embodiment, each thin-film layered structure 18 is divided into three LEDs 11.

With such processes, the LED array in which LEDs 11 are arranged on the first surface 10a of the substrate 10 at equal intervals in a square grid and in a matrix with 3 rows and 3 columns can be obtained.

Subsequently, anode electrodes 14 and the cathode electrodes 15 (connected to the anodes and the cathodes of the LEDs 11), the anode wiring 12, the cathode wiring 13 and the interconnection wiring 21 (connected to the respective anode electrodes 14 and the respective cathode electrodes 15) are formed using a vacuum deposition method, a photolithographic etching method or a lift-off method. Further, the anode driver IC 31 and the cathode driver IC 32 are mounted to the substrate 10. With this, the anode electrodes 14 and the cathode electrodes 15 of the respective LEDs 11 are connected to the anode driver IC 31 and the cathode driver IC 32 via the anode wiring 12, the cathode wiring 13 and the interconnection wiring 21.

Next, an operation of the above configured LED backlight device 100 will be described.

First, when a lighting signal sent from a superior device (such as a not shown personal computer) is inputted to the anode driver IC 31, an amplifier circuit of the anode driver IC 31 applies a constant current to the anode electrodes 14 of the LEDs 11 (closest to the anode driver IC 31 in respective columns) via the anode wiring 12. When the lighting signal is inputted to the cathode driver IC 32, the cathode driver IC 32 operates to allow the current to flow therein from the cathode electrodes 15 of the LEDs 11 (farthest from the anode driver IC 31 in respective columns) via the cathode wiring 13 connected to the cathode driver IC 32 by means of a switching circuit of a large capacity.

With this, the LEDs 11 of each column connected in series by interconnection wirings 21 are applied with current, and the LEDs 11 emit light.

As described above, the phosphor 30 and the reflection layer 41 are disposed so as to face each other on both sides of the LEDs 11 via the substrates 10 and 40. Therefore, when the LEDs 11 emit near-ultraviolet rays or ultraviolet rays having the wavelength in the range from 300 to 450 nm in response to the lighting signal, the rays proceeding toward the substrate 10 are directly incident on the phosphor 30 (as shown by the arrows A in FIG. 1), and the rays proceeding toward the substrate 40 are reflected by the reflection layer 41 (as shown by the arrows C in FIG. 1) and are incident on the phosphor 30. The phosphor 30 is excited by the near-ultraviolet rays or ultraviolet rays, and emits white light as shown by the arrows B in FIG. 1.

The LCD panel 200 (FIG. 5) disposed facing the LED backlight device 100 is illuminated by the light emitted by the phosphor 30 from the backside of the LCD panel 200.

In this regard, although the LEDs 11 of each column are connected in series in this embodiment, it is also possible to connect the LEDs 11 of each row in series. Further, it is also possible to connect obliquely arranged LEDs 11 in series. Further, it is also possible to drive LEDs 11 individually. It is also possible to combine LEDs 11 (connected in series) arranged in a row or column, arranged obliquely or various other way.

The above described substrates 10 and 40 are fixed to each other so that the first surface 10a of the substrate 10 (to which the LEDs 11 are fixed) faces the first surface 40a of the substrate 40. In this regard, In this regard, the substrates 10 and 40 can be fixed to each other by filling a material such as silicone-based resin having high optical transparency into between the substrates 10 and 40, deforming the material, and drying the material.

Furthermore, it is also possible to establish an inert gas atmosphere or to substantially form a vacuum in a space between the LED backlight device 100 and the LCD panel 200 (FIG. 5), in order to prevent the oxidization or deterioration of the phosphor 30.

As described above, according to the first embodiment, the LEDs 11, the anode wiring 12 and the cathode wiring 13 are formed on the substrate 10 having optical transparency, and the LEDs 11 are connected to the anode wiring 12 and the cathode wirings 13 using the semiconductor process, and therefore it becomes possible to accomplish a thin and large-size LED backlight device 100.

The LEDs 11 can be formed to have a desired size and shape, and can be disposed on a predetermined position on the surface of the substrate 10. Further, the phosphor 30 and the reflection layer 41 are disposed so as to face each other on both sides of the LEDs 11 via the substrates 10 and 40. With such a configuration, a variation in brightness can be restricted by adjusting the shapes and positions of LEDs 11 and thicknesses of the substrates 10 and 41. Moreover, both of the light emitted by the LEDs 11 toward the substrate 10 and the light emitted by the LEDs 11 toward the substrate 40 can be used to excite the phosphor 30, and therefore the entire brightness can be enhanced.

Second Embodiment

Next, the second embodiment of the present invention will be described. Components of the second embodiment that are the same as those of the first embodiment are assigned the same reference numerals, and descriptions thereof will be omitted. Further, descriptions of operations and advantages that are same as those of the first embodiment will be omitted.

Figure 9:
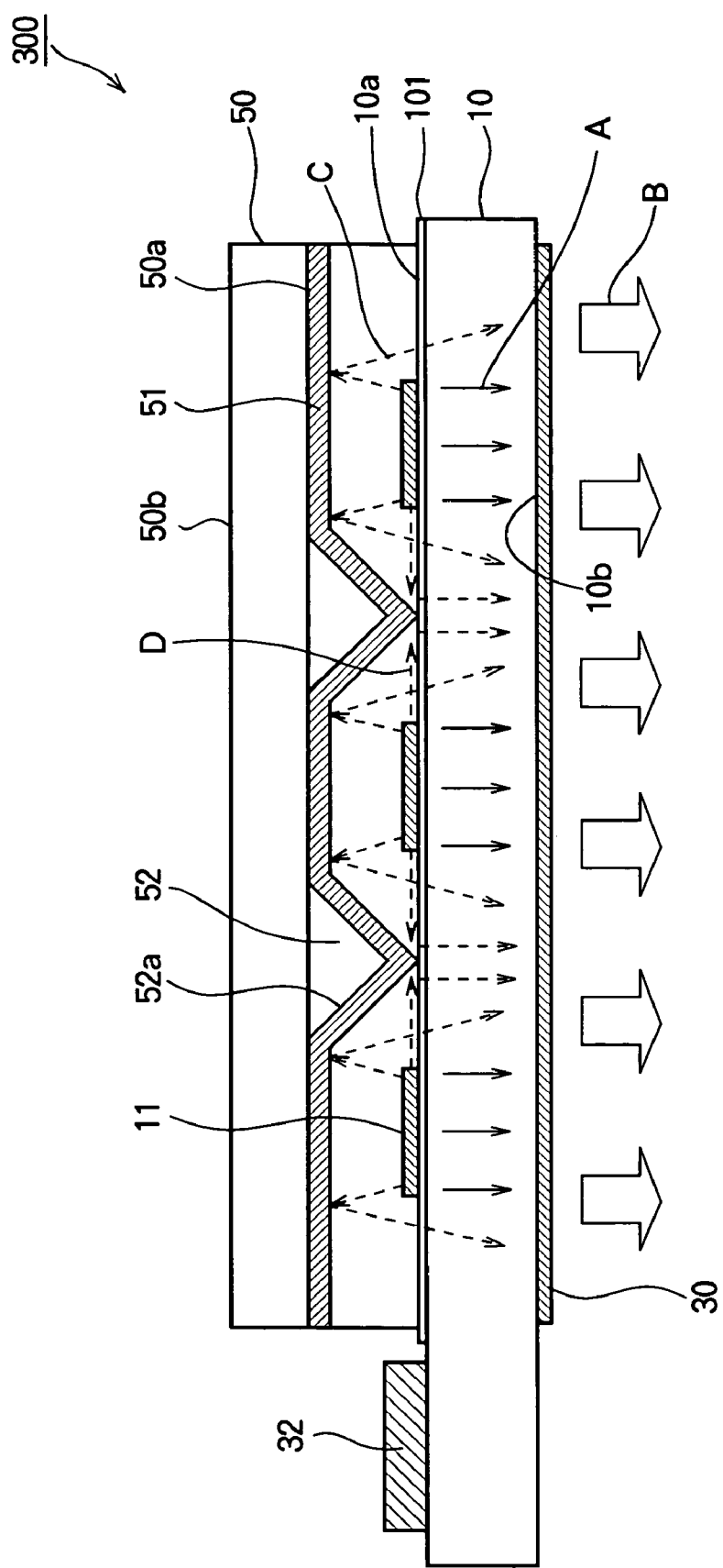
FIG. 9 is a side sectional view showing an LED backlight device according to the second embodiment of the present invention.
Figure 10:
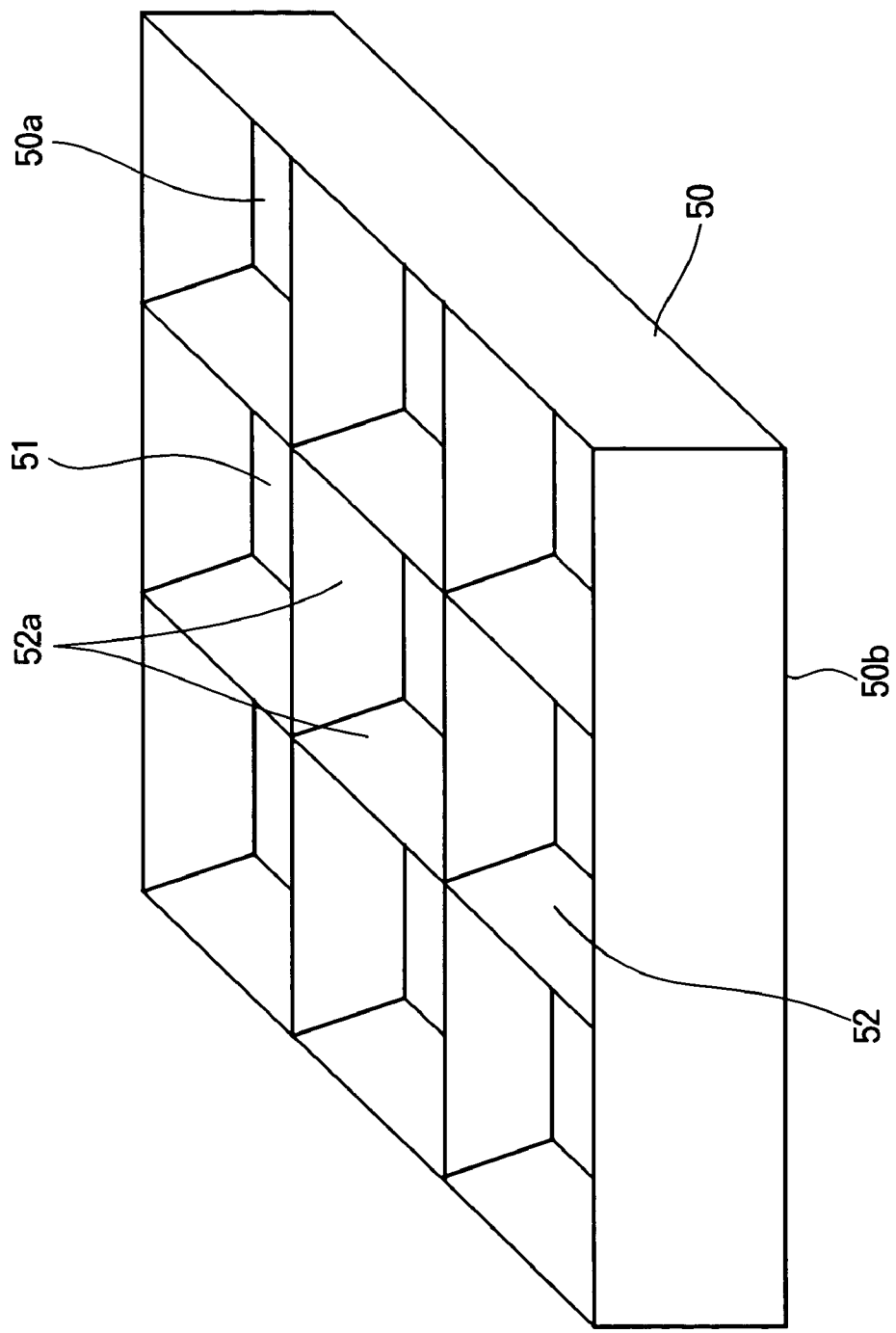
FIG. 10 is a perspective view showing a second substrate of the LED backlight device according to the second embodiment of the present invention, as seen from a first surface side thereof.

FIG. 9 is a side sectional view showing the LED backlight device according to the second embodiment of the present invention. FIG. 10 is a perspective view showing the LED backlight device according to the second embodiment of the present invention, as seen from the first surface side thereof.

The LED backlight device 300 of the second embodiment includes a substrate 10 (as a first substrate) and a substrate 50 (as a second substrate) each of which is in the form of a flat plate.

The substrate 10 has a first surface 10a (i.e., an upper surface in FIG. 9) and a second surface 10b (i.e., a lower surface in FIG. 9) as was described in the first embodiment. The substrate 50 has a first surface 50a (i.e., a lower surface in FIG. 9) facing the substrate 10 and a second surface 50b (i.e., an upper surface in FIG. 9).

A plurality of LEDs 11 are arranged on the first surface 10a of the substrate 10. A plurality of protrusions 52 are formed on the first surface 50a of the substrate 50. The protrusions 52 have inclined surfaces 52a which are inclined with respect to flat portions of the first surface 50a of the substrate 50. A reflection layer 51 is fixed to the first surface 50a and the protrusions 52 of the substrate 50 so as to entirely cover the first surface 50a. The first surface 10a of the substrate 10 and the first surface 50a of the substrate 50 face each other. Each protrusion 52 of the substrate 50 is disposed so as to face a center position between adjacent LEDs 11 on the first surface 10a of the substrate 10. The apexes of the protrusions 52 contact the first surface 10a of the substrate 10.

As shown in FIG. 10, the protrusions 52 are formed in a grid pattern so as to surround respective spaces in which LEDs 11 (FIG. 9) are disposed.

The LEDs 11 on the first surface 10a and the phosphor 30 on the second surface 10b of the substrate 10 face each other. Further, the LEDs 11 on the first surface 10a of the substrate 10 and the reflection layer 51 on flat portions of the first surface 50a of the substrate 50 face each other.

The phosphor 30 on the second surface 10b of the substrate 10 and the reflection layer 51 on flat portions of the first surface 50a of the substrate 50 face each other on both sides of the LEDs 11 via the substrates 10 and 50. With such a configuration, the light emitted by the LEDs 11 in the direction toward the substrate 10 is incident on the phosphor 30 as shown by arrows A in FIG. 9. The light emitted by the LEDs 11 in the direction toward the substrate 50 is reflected by the reflection layer 51 on the flat portions of the first surface 50a of the substrate 50, and is incident on the phosphor 30 as shown by arrows C in FIG. 9.

The protrusions 52 have inclined surfaces 52a and the reflection surface 51 is also formed on the inclined surfaces 52a. Therefore, the light emitted by peripheral end surfaces of the LEDs 11 is reflected by the reflection layer 51 on the inclined surfaces 52a of the protrusions 52 at angles corresponding to the inclination angles of the inclined surfaces 52a.

The lights emitted by the LEDs 11 indicated by arrows A, C and D are near-ultraviolet rays or ultraviolet rays having the wavelength in the range from 300 to 450 nm.

The phosphor 30 is irradiated with near-ultraviolet rays or ultraviolet rays directly proceeding from the LEDs 11 and reflected by the reflection layer 51, and emits white light as shown in arrows B in FIG. 9.

The other components of the LED backlight device 300 and the LCD device are the same as those described in the first embodiment, and therefore duplicate descriptions are omitted.

Next, an operation of the LED backlight device 300 will be described.

Referring to FIG. 2, when a lighting signal sent from the superior device (such as a not shown personal computer) is inputted to the anode driver IC 31, the amplifier circuit of the anode driver IC 31 applies a constant current to the anode electrodes 14 of the LEDs 11 closest to the anode driver IC 31 in respective columns via the anode wiring 12. When the lighting signal is inputted to the cathode driver IC 32, the cathode driver IC 32 operates to allow the current to flow therein from the cathode electrodes 15 of the LEDs 11 farthest from the anode driver IC 31 in respective columns via the cathode wiring 13 connected to the cathode driver IC 32 by means of the switching circuit of a large capacity.

With this, the LEDs 11 of each column connected in series by interconnection wirings 21 are applied with current, and the LEDs 11 emit light.

Referring to FIG. 9, the phosphor 30 and the reflection layer 51 are disposed so as to face each other on both sides of the LEDs 11 via the substrates 10 and 50. Therefore, when the LEDs 11 emit near-ultraviolet rays or ultraviolet rays having the wavelength in the range from 300 to 450 nm in response to the lighting signal, the rays proceeding toward the substrate 10 are directly incident on the phosphor 30 (as shown by the arrows A in FIG. 9), and the rays proceeding toward the substrate 50 is reflected by the reflection layer 51 (as shown by the arrows C in FIG. 1) and is incident on the phosphor 30. Further, the light emitted from the peripheral end surfaces of the LEDs 11 (indicated by arrows D in FIG. 9) is reflected by the reflection layer 51 on the inclined surface 52a of each protrusion 52 at an angle corresponding to the inclination of the inclined surface 52a, and is incident on the phosphor 30.

Therefore, when the LEDs 11 emit near-ultraviolet rays or ultraviolet rays having the wavelength in the range from 300 to 450 nm from both surfaces and peripheral end surfaces of the LEDs 11, the phosphor 30 is excited by the near-ultraviolet rays or ultraviolet rays directly proceeding from the LEDs 11 or reflected by the reflection layer 51, and emits white light as shown by the arrows B in FIG. 9. The LCD panel 200 (FIG. 5) disposed facing the LED backlight device 300 is illuminated by the light emitted by the phosphor 30 from the back-side of the LCD panel 200.

The above described substrates 10 and 50 are fixed to each other so that the first surface 10a of the substrate 10 faces the first surface 50a of the substrate 50 and the protrusions 52 (to which the reflection layer 51 is fixed) contact the first surface 10a of the substrate 10 at positions between the adjacent LEDs 11. In this regard, the substrates 10 and 50 can be fixed to each other by filling a material such as silicone-based resin having high optical transparency into between the substrates 10 and 50, deforming the material, and drying the material.

As described above, in the second embodiment, the phosphor 30 and the reflection layer 51 are disposed so as to face each other on both sides of the LEDs 11 via the substrates 10 and 50. Further, the protrusions 52 contact the first surface 10a of the substrate 10 at positions between the adjacent LEDs 11, and the reflection layer 51 is fixed to the inclined surfaces 52a of the protrusions 52. Therefore, the light emitted by the peripheral end surfaces of the LEDs 11 is reflected by the reflection layer 51 on the protrusions 52, and is incident on the phosphor 30. Accordingly, the phosphor 30 is irradiated with the light emitted by the peripheral end surfaces of the LEDs 11, as well as the light emitted by both surfaces of the LEDs 11. As a result, a thin and large-size LED backlight device having enhanced brightness can be obtained.

Third Embodiment

Next, the third embodiment of the present invention will be described. Components that are the same as those of the first or the second embodiment are assigned the same reference numerals, and duplicate descriptions thereof will be omitted. Further, descriptions of operation and advantages that are the same as those of the first or the second embodiment will be omitted.

Figure 11:
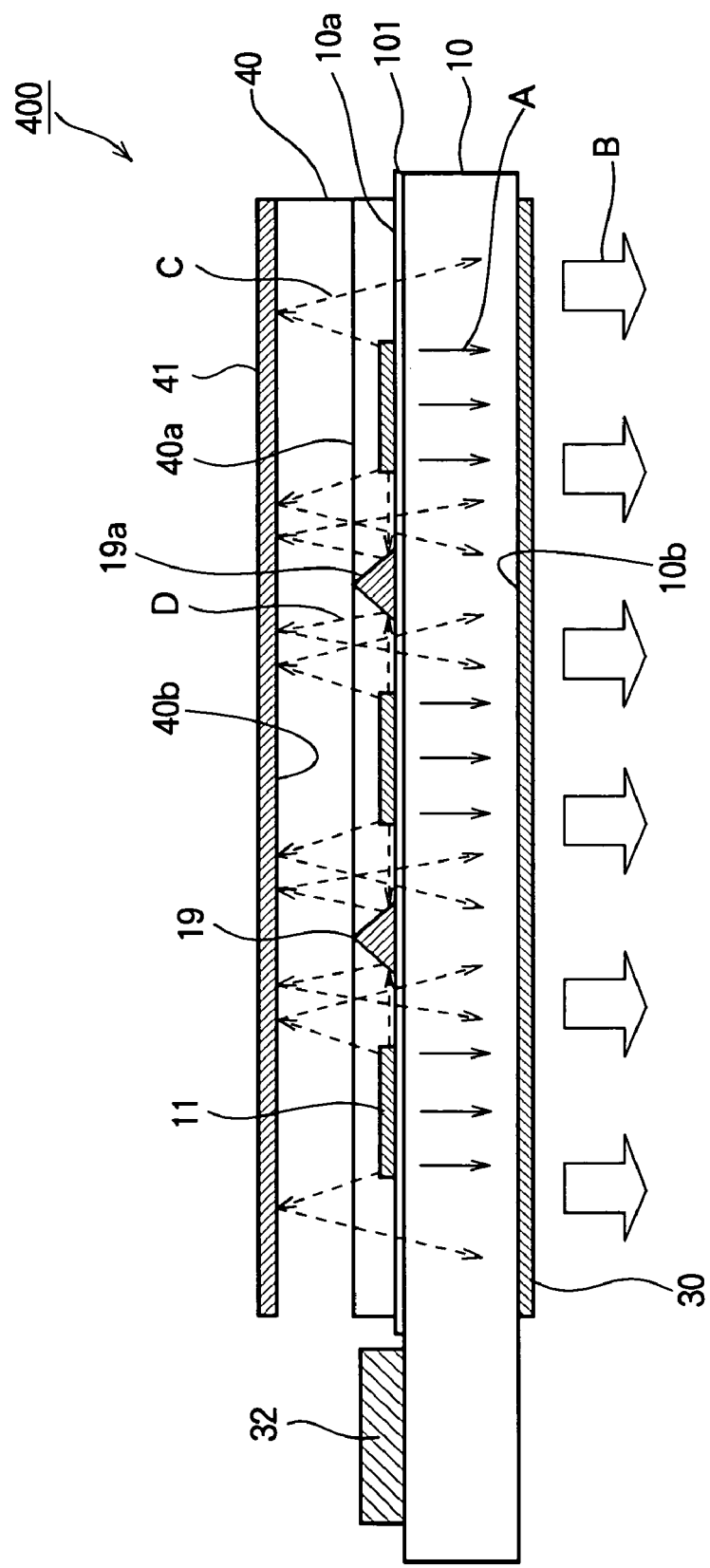
FIG. 11 is a side sectional view showing an LED backlight device according to the third embodiment of the present invention.
Figure 12:
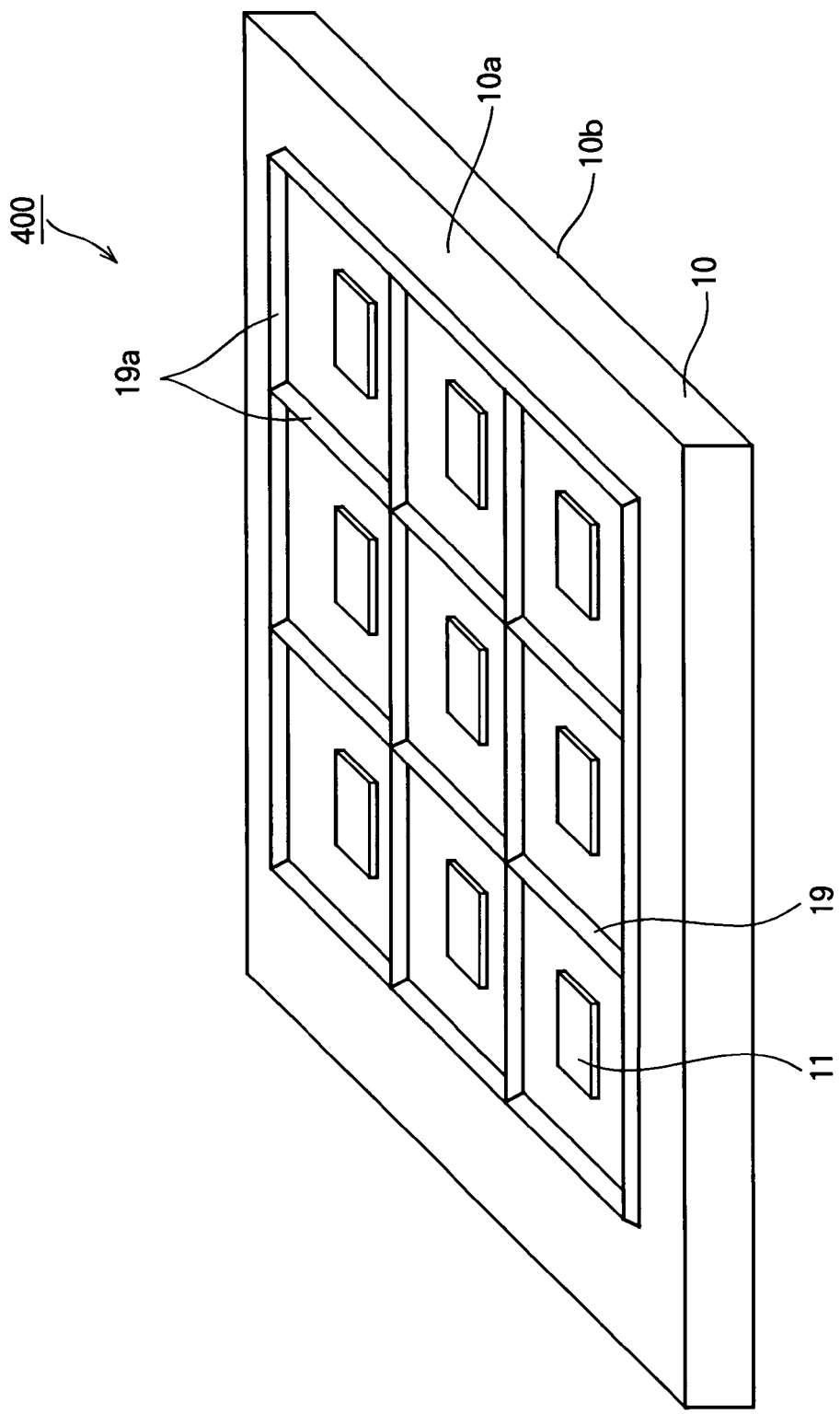
FIG. 12 is a perspective view showing a first substrate of the LED backlight device according to the third embodiment of the present invention, as seen from a first surface side thereof.

FIG. 11 is a side sectional view showing the LED backlight device according to the third embodiment of the present invention. FIG. 12 is a perspective view showing a first substrate of the LED backlight device according to the third embodiment of the present invention, as seen from the first surface side thereof.

In the third embodiment, the LED backlight device 400 includes a substrate 10 (i.e., a first substrate) and a substrate 40 (i.e., a second substrate) each of which is in the form of a flat plate. The substrate 10 has a first surface 10a (i.e., an upper surface in FIG. 11) and a second surface 10b (i.e., a lower surface in FIG. 11) as was described in the first embodiment. The substrate 40 has a first surface 40a (i.e., a lower surface in FIG. 11) facing the substrate 10 and a second surface 40b (i.e., an upper surface in FIG. 11). The first surface 10a of the substrate 10 and the first surface 40a of the substrate 40 face each other. A plurality of LEDs 11 are arranged on the first surface 10a of the substrate 10. A reflection layer 41 is fixed to the second surface 40b of the substrate 40 so as to entirely cover the second surface 40b. A plurality of protrusions 19 are formed on the first surface 10a of the substrate 10. The protrusions 19 protrude toward the substrate 40 and have inclined surfaces 19a. Each protrusion 19 is disposed on a center position between adjacent LEDs 11. Tips (apexes) of the protrusions 19 contact the first surface 40a of the substrate 40 in a state where the substrate 10 and the substrate 40 face each other. The protrusions 19 are composed of material that reflects the light (in this example, near-ultraviolet rays or ultraviolet rays).

As shown in FIG. 12, the protrusions 19 are formed in a grid pattern so as to surround respective spaces in which LEDs 11 are disposed.

The LEDs 11 and the phosphor 30 are respectively provided on the first and second surfaces 10a and 10b of the substrate 10 so that the LEDs 11 and the phosphors 30 face each other. The LEDs 11 and the reflection layer 41 are respectively provided on the first surface 10a of the substrate 10 and the second surface 40b of the substrate 40 so that the LEDs 11 and the reflection layer 41 face each other.

With such a configuration, the phosphor 30 and the reflection layer 41 face each other on both sides of the LEDs 11. The light emitted by the LEDs 11 toward the substrate 10 is directly incident on the phosphor 30 as shown by arrows A in FIG. 11.

Further, the light emitted by the LEDs 11 is reflected by the reflection layer 41 on the first surface 10a of the substrate 10 as shown by arrows C in FIG. 11, and is incident on the phosphor 30.

Furthermore, since the protrusions 19 have inclined surface 19a, the light emitted by the peripheral end surfaces of the LEDs 11 is reflected by the inclined surfaces 19a of the protrusions 19 (as shown by arrows D in FIG. 11) at angles corresponding to the inclinations of the inclined surfaces 19a, is further reflected by the reflection layer 41 of the substrate 40, and is incident on the phosphor 30.

The light emitted by the LEDs 11 indicated by arrows A, C and D is near-ultraviolet rays or ultraviolet rays having the wavelength in the range from 300 to 450 nm.

The phosphor 30 is irradiated with the near-ultraviolet rays or ultraviolet rays directly proceeding from the LEDs 11 or reflected by the reflection layer 41, and emits white light as shown by arrows B.

The other components of the LED backlight device 400 and the LCD device are the same as those described in the first or second embodiment, and therefore duplicate descriptions are omitted.

Next, an operation of the LED backlight device 400 will be described.

Referring to FIG. 2, when a lighting signal sent from the superior device (such as a not shown personal computer) is inputted to the anode driver IC 31, the amplifier circuit of the anode driver IC 31 applies a constant current to the anode electrodes 14 of the LEDs 11 closest to the anode driver IC 31 in respective columns via the anode wiring 12. When the lighting signal is inputted to the cathode driver IC 32, the cathode driver IC 32 operates to allow the current to flow therein from the cathode electrodes 15 of the LEDs 11 farthest from the anode driver IC 31 in respective columns via the cathode wiring 13 connected to the cathode driver IC 32 by means of the switching circuit of a large capacity.

With this, the LEDs 11 of each column connected in series by interconnection wirings 21 are applied with current, and the LEDs 11 emit light.

Referring to FIG. 11, the phosphor 30 and the reflection layer 41 are disposed so as to face each other on both sides of the LEDs 11. Therefore, when the LEDs 11 emit near-ultraviolet rays or ultraviolet rays having the wavelength in the range from 300 to 450 nm, the rays proceeding toward the substrate 10 is directly incident on the phosphor 30 (as shown by the arrows A in FIG. 11), and the rays proceeding toward the substrate 40 is reflected by the reflection layer 41 (as shown by the arrows C in FIG. 11) and is incident on the phosphor 30. Furthermore, since the protrusions 19 have inclined surfaces 19a, the rays emitted by the peripheral end surfaces of the LEDs 11 are reflected by the inclined surfaces 19a of the protrusions 19 (as shown by the arrows D in FIG. 11) at angles corresponding to the inclinations of the inclined surfaces 19a, are further reflected by the reflection layer 41 of the substrate 40, and are incident on the phosphor 30.

Therefore, when the LEDs 11 emit near-ultraviolet rays or ultraviolet rays having the wavelength in the range from 300 to 450 nm from both surfaces and peripheral end surfaces of the LEDs 11, the phosphor 30 is excited by the near-ultraviolet rays or ultraviolet rays directly proceeding from the LEDs 11 and reflected by the reflection layer 41, and emits white light as shown by the arrows B in FIG. 11. The LCD panel 200 (FIG. 5) disposed facing the LED backlight device 400 is illuminated by the light emitted by the phosphor 30 from the backside of the LCD panel 200.

The above described substrates 10 and 40 are fixed to each other so that the first surface 10a of the substrate 10 faces the first surface 40a of the substrate 40 and the tips of the protrusions 19 contact the first surface 40a of the substrate 40. In this regard, the substrates 10 and 40 can be fixed to each other by filling a material such as silicone-based resin having high optical transparency into between the substrates 10 and 40, deforming the material, and drying the material.

As described above, in the third embodiment, the phosphor 30 and the reflection layer 41 are disposed so as to face each other on both sides of the LEDs 11, and the protrusions 19 (each of which is disposed on the center position between the adjacent LEDs 11) have inclined surfaces 19a. Therefore, the light emitted by the peripheral end surfaces of the LEDs 11 is reflected by the inclined surfaces 19a of the protrusions 19, and is incident on the phosphor 30. Accordingly, the phosphor 30 is irradiated with the light emitted by the peripheral end surfaces of the LEDs 11, as well as the light emitted by both surfaces of the LEDs 11. As a result, a thin and large-size LED backlight device having enhanced brightness can be obtained.

Fourth Embodiment

Next, the fourth embodiment of the present invention will be described. Components that are the same as those of the first, second or third embodiment are assigned the same reference numerals, and duplicate descriptions thereof will be omitted. Further, descriptions of operation and advantages that are the same as those of the first, second or embodiment will be omitted.

Figure 13:
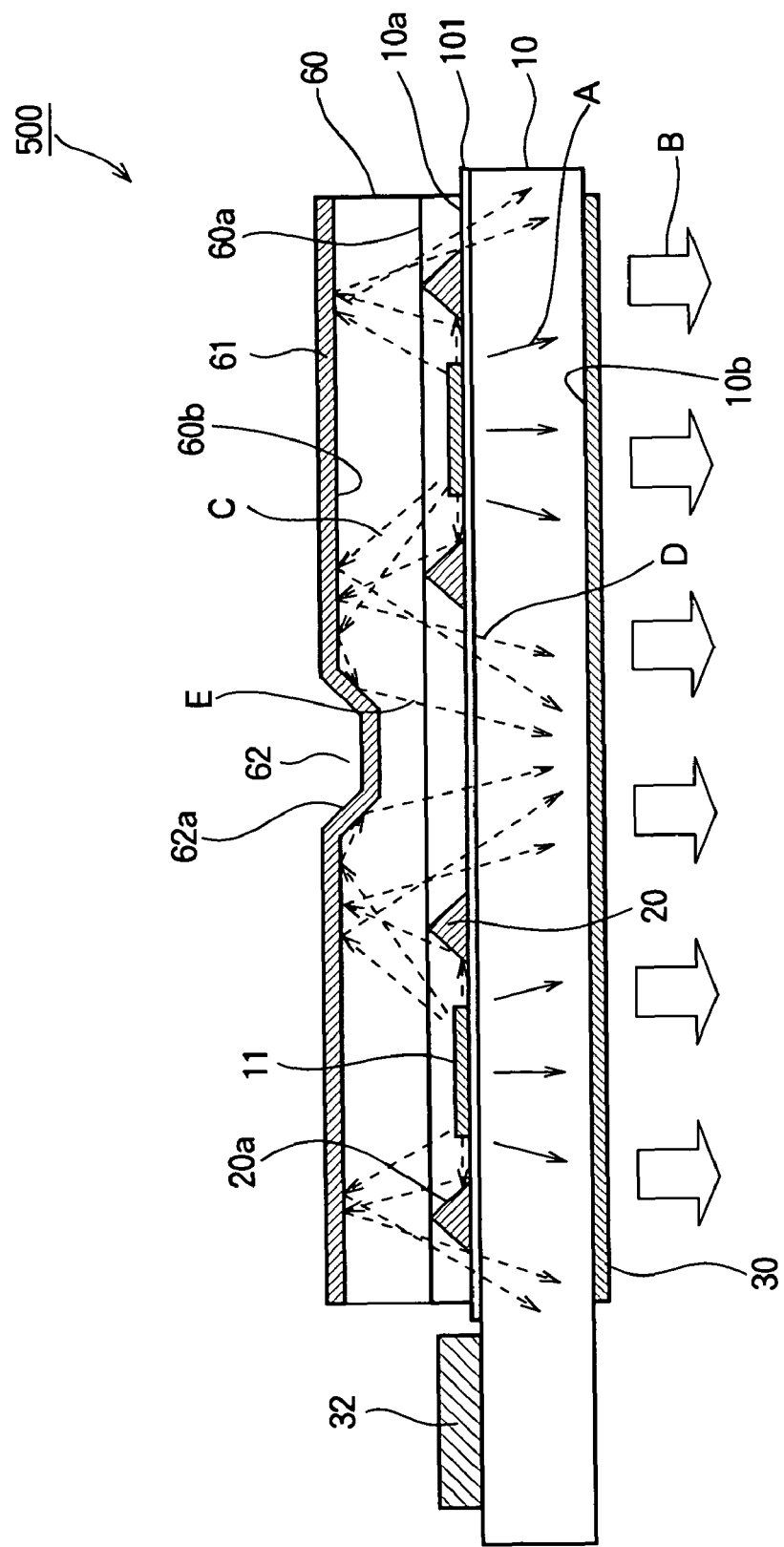
FIG. 13 is a side sectional view showing an LED backlight device according to the fourth embodiment of the present invention.
Figure 14:
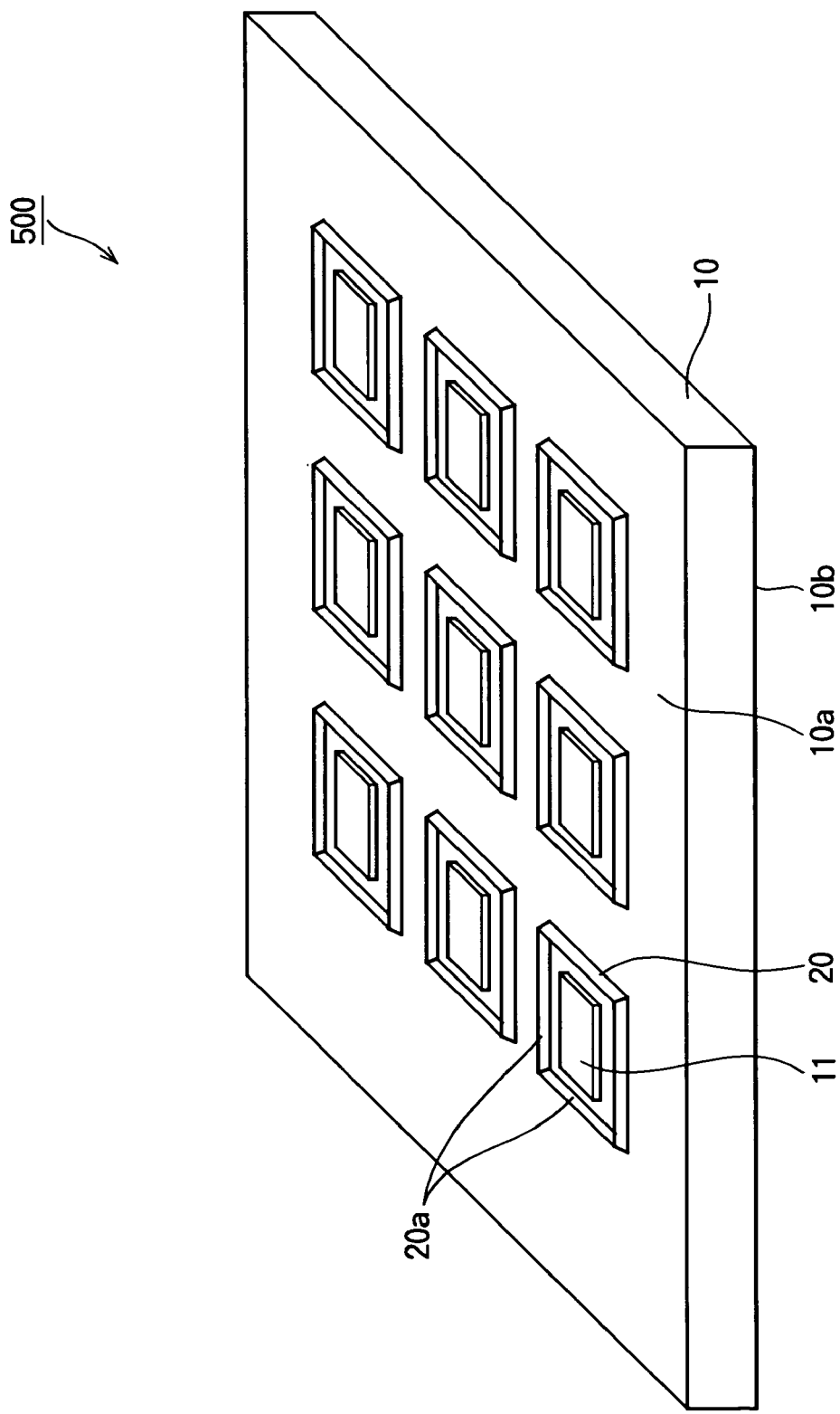
FIG. 14 is a perspective view showing a first substrate of the LED backlight device according to the fourth embodiment of the present invention, as seen from a first surface side thereof.
Figure 15:
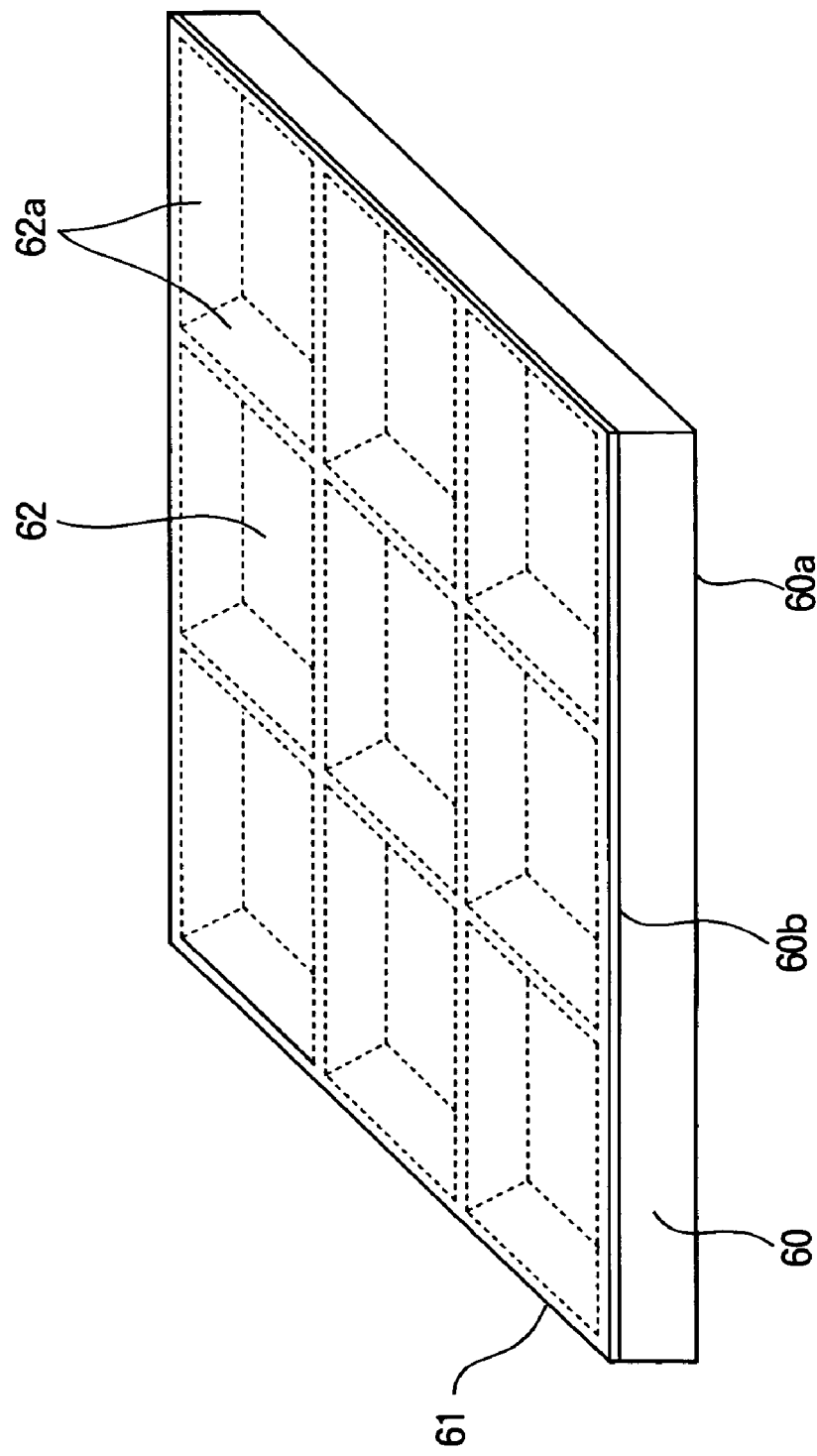
FIG. 15 is a perspective view showing a second substrate of the LED backlight device according to the fourth embodiment of the present invention, as seen from a second surface side thereof.

FIG. 13 is a side sectional view showing the LED backlight device according to the fourth embodiment of the present invention. FIG. 14 is a perspective view showing a first substrate of the LED backlight device according to the fourth embodiment of the present invention, as seen from the first surface side. FIG. 15 is a perspective view showing a second substrate of the LED backlight device according to the fourth embodiment of the present invention, as seen from the first surface side.

In the fourth embodiment, the LED backlight device 500 includes a substrate 10 (i.e., a first substrate) and a substrate 60 (i.e., a second substrate) each of which is in the form of a flat plate. The substrate 10 has a first surface 10a (i.e., an upper surface in FIG. 13) and a second surface 10b (i.e., a lower surface in FIG. 13). The substrate 60 has a first surface 60a (i.e., a lower surface) 60a facing the substrate 10 and a second surface 60b (i.e., an upper surface). The first surface 10a of the substrate 10 and the first surface 60a of the substrate 60 face each other. A plurality of LEDs 11 are arranged on the first surface 10a of the substrate 10. A reflection layer 61 is fixed to the second surface 60b of the substrate 60 so as to entirely cover the second surface 60b. A plurality of protrusions 20 are formed on the first surface 10a of the substrate 10. The protrusions 20 have inclined surfaces 20a. As shown in FIG. 14, the protrusions 20 are formed so as to surround the respective LEDs 11 on the first surface 10a of the substrate 10.

As shown in FIG. 15, a plurality of concaves 62 are formed on the second surface 60b of the substrate 60. The concaves 62 have depths toward the first surface 60a of the substrate 60, and have inclined surfaces 62a. A reflection layer 61 is fixed to the second surface 60b of the substrate 60 including the inclined surfaces 62a of the concaves 62. As shown in FIG. 13, the first surface 10a of the substrate 10 and the first surface 60a of the substrate 60 face each other. Each concave 62 is disposed at a center position between the adjacent LEDs 11 on the first surface 10a of the substrate 10. Tips (apexes) of the protrusions 20 contact the first surface 60a of the substrate 60. The protrusions 20 are formed of material such as Aluminum or the like that reflects the light (in this example, near-ultraviolet rays or ultraviolet rays).

The LEDs 11 and the phosphor 30 are respectively formed on the first and second surfaces 10a and 10b of the substrate 10 so that LEDs 11 and phosphor 30 face each other. The LEDs 11 and the reflection surface 61 are respectively formed on the first surface 10a of the substrate 10 and the second surface 60b of the substrate 60 so that the LEDs 11 and the reflection layer 61 face each other.

With such a configuration, the phosphor 30 and the reflection layer 61 face each other on both sides of the LEDs 11. Therefore, the light emitted by the LEDs 11 in the direction toward the substrate 10 is incident on the phosphor 30 as shown by arrow A in FIG. 13. Further, the light emitted by the LEDs 11 is reflected by the reflection layer 61 on the second surface 60b of the substrate 60 as shown by arrows C, and is incident on the phosphor 30.

Furthermore, since the protrusions 20 have inclined surface 20a, the light emitted by the peripheral end surfaces of the LEDs 11 is reflected by the inclined surfaces 20a of the protrusions 20 (as shown by arrows D) at angles corresponding to the inclinations of the inclined surfaces 20a, is further reflected by the reflection layer 61 of the substrate 60, and is incident on the phosphor 30.

Moreover, since the concaves 62 have inclined surfaces 62a, part of the light emitted by the LEDs 11 in the direction toward the substrate 60 is reflected by the reflection layer 61 on the inclined surfaces 62a (as shown by arrows E) at angles corresponding to the inclinations of the inclined surfaces 20a, and is incident on the phosphor 30.

The light emitted by the LEDs 11 indicated by arrows A, C, D and E is near-ultraviolet rays or ultraviolet rays having the wavelength in the range from 300 to 450 nm.

The phosphor 30 is irradiated with the near-ultraviolet rays or ultraviolet rays directly proceeding from the LEDs 11 or reflected by the reflection layer 61, and emits white light as shown by arrows B.

The other components of the LED backlight device 500 and the LCD device are the same as those described in the first, second or third embodiment, and therefore duplicate descriptions are omitted.

Next, an operation of the LED backlight device 500 will be described.

Referring to FIG. 2, when a lighting signal sent from the superior device (such as a not shown personal computer) is inputted to the anode driver IC 31, the amplifier circuit of the anode driver IC 31 applies a constant current to the anode electrodes 14 of the LEDs 11 closest to the anode driver IC 31 in respective columns via the anode wiring 12. When the lighting signal is inputted to the cathode driver IC 32, the cathode driver IC 32 operates to allow the current to flow therein from the cathode electrodes 15 of the LEDs 11 farthest from the anode driver IC 31 in respective columns via the cathode wiring 13 connected to the cathode driver IC 32 by means of the switching circuit of a large capacity.

With this, the LEDs 11 of each column connected in series by interconnection wirings 21 are applied with current, and the LEDs 11 emit light.

Referring to FIG. 13, the phosphor 30 and the reflection layer 61 are disposed so as to face each other on both sides of the LEDs 11. Therefore, when the LEDs 11 emit near-ultraviolet rays or ultraviolet rays having the wavelength in the range from 300 to 450 nm, the rays proceeding toward the substrate 10 is directly incident on the phosphor 30 (as shown by the arrows A), and the rays proceeding toward the substrate 60 is reflected by the reflection layer 61 (as shown by the arrows C) and is incident on the phosphor 30. Furthermore, since the protrusions 20 have inclined surface 20a, the rays emitted by the peripheral end surfaces of the LEDs 11 are reflected by the inclined surfaces 20a of the protrusions 20 at angles corresponding to the inclinations of the inclined surfaces 20a, are reflected by the reflection layer 61 of the substrate 60 and are incident on the phosphor 30 as shown by the arrows D. Moreover, since the concaves 62 have inclined surface 62a, part of the rays emitted by the LEDs 11 toward the substrate 60 is reflected by the reflection layer 61 on the inclined surfaces 62a at angles corresponding to the inclinations of the inclined surfaces 62a, and is incident on the phosphor 30 as shown by the arrows E.

Therefore, when the LEDs 11 emit near-ultraviolet rays or ultraviolet rays having the wavelength in the range from 300 to 450 nm from both surfaces and the peripheral end surfaces, the phosphor 30 is excited by the near-ultraviolet rays or ultraviolet rays directly proceeding from the LEDs 11 or reflected by the reflection layer 61, and emits white light as shown by the arrows B in FIG. 13. The LCD panel 200 (FIG. 5) disposed facing the LED backlight device 500 is illuminated by the light emitted by the phosphor 30 from the backside of the LCD panel 200.

The above described substrates 10 and 60 are fixed to each other so that the first surface 10a of the substrate 10 faces the first surface 60a of the substrate 60 and the tips of the protrusions 20 contact the first surface 60a of the substrate 60. In this regard, the substrates 10 and 60 can be fixed to each other by filling a material such as silicone-based resin having high optical transparency into between the substrates 10 and 60, deforming the material, and drying the material.

As described above, in the fourth embodiment, the phosphor 30 and the reflection layer 61 are disposed so as to face each other on both sides of the LEDs 11, and the protrusions 20 with inclined surfaces 20a surround the respective LEDs 11. Further, the concaves 62 (to which the reflection layer 61 is fixed) have inclined surfaces 62a. Therefore, the light emitted by the peripheral end surfaces of the LEDs 11 is reflected by the protrusions 20, and is incident on the phosphor 30. Further, part of the light emitted by the LEDs 11 is reflected by the reflection layer 61 on the inclined surfaces 62a of the concaves 62, and is incident on the phosphor 30. Accordingly, the phosphor 30 is irradiated with the light emitted by the peripheral end surfaces of the LEDs 11, as well as the light emitted by both surfaces of the LEDs 11. As a result, a thin and large-size LED backlight device can be obtained.

While the preferred embodiments of the present invention have been illustrated in detail, it should be apparent that modifications and improvements may be made to the invention without departing from the spirit and scope of the invention as described in the following claims.

What is claimed is:

1. An LED backlight device comprising:
   a first substrate having optical transparency and having a first surface and a second surface opposite to said first surface;
   an LED thin-film layered structure fixed to said first surface of said first substrate, said LED thin-film layered structure being formed of epitaxially grown inorganic material layers as a P-N junction device;
   an anode electrode and a cathode electrode provided on said LED thin-film layered structure;
   an anode driver IC and a cathode driver IC for driving said LED thin-film layered structure;
   an anode wiring provided on said first surface of said first substrate for electrically connecting said anode driver IC and said anode electrode of said LED thin-film layered structure;
   a cathode wiring provided on said first surface of said first substrate for electrically connecting said cathode driver IC and said cathode electrode of said LED thin-film layered structure;
   a phosphor provided on said second surface of said first substrate;
   a second substrate having optical transparency and having a first surface and a second surface opposite to said first surface, said first surface of said second substrate facing said first surface of said first substrate, and
   a reflection layer provided on said second surface of said second substrate.

2. The LED backlight device according to claim 1, wherein said LED thin-film layered structure is fixed to said first surface of said first substrate by means of intermolecular force, and emits near-ultraviolet rays or ultraviolet rays having the wavelength in a range from 300 nm to 450 nm.

3. The LED backlight device according to claim 1, wherein said phosphor is formed by mixing a phosphor that emits red light having the wavelength in the range from 620 nm to 710 nm when exposed to light having the wavelength in the range from 300 nm to 450 nm, a phosphor that emits green light having the wavelength in the range from 500 nm to 580 nm when exposed to light having the wavelength in the range from 300 nm to 450 nm, a phosphor that emits blue light having the wavelength in the range from 450 nm to 500 nm when exposed to light having the wavelength in the range from 300 nm to 450 nm, and by coating a resultant mixed material.

4. The LED backlight device according to claim 1, wherein said first surface of said first substrate is formed of an organic insulation film or an inorganic insulation film, and is planarized.

5. The LED backlight device according to claim 1, wherein a plurality of said LED thin-film layered structures are formed by epitaxially growing inorganic material layers as a p-n junction device on a sacrificial layer on a base material different from said first substrate, peeling said inorganic material layers from said base material by removing said sacrificial layer using etching, fixing said inorganic material layers to said first surface of said first substrate by means of intermolecular force, and dividing said inorganic material layers into said plurality of LED thin-film layered structures using etching.

6. The LED backlight device according to claim 1, wherein a plurality of said LED thin-film layered structures are disposed at intervals in rows and columns on said first surface of said first substrate.

7. The LED backlight device according to claim 1, wherein a plurality of said LED thin-film layered structures are disposed in columns or rows,
   wherein said anode wiring electrically connects said anode driver IC and said anode electrode of an endmost LED thin-film layered structure of each column or row of said LED thin-film layered structures;
   wherein said cathode wiring electrically connects said cathode driver IC and said cathode electrode of the other endmost LED thin-film layered structure of each column or row of said LED thin-film layered structures, and wherein an interconnection wiring connects said LED thin-film layered structures of each column or row in series.

8. An LED backlight device comprising:

a first substrate having optical transparency and having a first surface and a second surface opposite to said first surface;

an LED thin-film layered structure fixed to said first surface of said first substrate, said LED thin-film layered structure being formed of epitaxially grown inorganic material layers as a P-N junction device;

an anode electrode and a cathode electrode provided on said LED thin-film layered structure;

an anode driver IC and a cathode driver IC for driving said LED thin-film layered structure;

an anode wiring provided on said first surface of said first substrate for electrically connecting said anode driver IC and said anode electrode of said LED thin-film layered structure;

a cathode wiring provided on said first surface of said first substrate for electrically connecting said cathode driver IC and said cathode electrode of said LED thin-film layered structure;

a phosphor provided on said second surface of said first substrate;

a second substrate having a first surface and a second surface opposite to said first surface, said first surface of said second substrate facing said first surface of said first substrate;

a protrusion provided on said first surface of said second substrate so as to face a position on said first surface of said first substrate, said positing being apart from said LED thin-film layered structure by a certain distance, said protrusion having an inclined surface, and a reflection layer provided to cover said first surface of said second substrate and said protrusion.

9. The LED backlight device according to claim 8, wherein said LED thin-film layered structure is fixed to said first surface of said first substrate by means of intermolecular force, and emits near-ultraviolet rays or ultraviolet rays having the wavelength in a range from 300 nm to 450 nm.

10. The LED backlight device according to claim 8, wherein said phosphor is formed by mixing a phosphor that emits red light having the wavelength in the range from 620 nm to 710 nm when exposed to light having the wavelength in the range from 300 nm to 450 nm, a phosphor that emits green light having the wavelength in the range from 500 nm to 580 nm when exposed to light having the wavelength in the range from 300 nm to 450 nm, a phosphor that emits blue light having the wavelength in the range from 450 nm to 500 nm when exposed to light having the wavelength in the range from 300 nm to 450 nm, and by coating a resultant mixed material.

11. The LED backlight device according to claim 8, wherein said first surface of said first substrate is formed of an organic insulation film or an inorganic insulation film, and is planarized.

12. The LED backlight device according to claim 8, wherein a plurality of said LED thin-film layered structures are formed by epitaxially growing inorganic material layers as a p-n junction device on a sacrificial layer on a base material different from said first substrate, peeling said inorganic material layers from said base material by removing said sacrificial layer using etching, fixing said inorganic material layers to said first surface of said first substrate by means of intermolecular force, and dividing said inorganic material layers into said plurality of LED thin-film layered structures using etching.

13. The LED backlight device according to claim 8, wherein a plurality of said LED thin-film layered structures are disposed at intervals in rows and columns on said first surface of said first substrate.

14. The LED backlight device according to claim 8, wherein a plurality of said LED thin-film layered structures are disposed in columns or rows, wherein said anode wiring electrically connects said anode driver IC and said anode electrode of an endmost LED thin-film layered structure of each column or row of said LED thin-film layered structures;

wherein said cathode wiring electrically connects said cathode driver IC and said cathode electrode of the other endmost LED thin-film layered structure of each column or row of said LED thin-film layered structures, and wherein an interconnection wiring connects said LED thin-film layered structures of each column or row in series.

15. An LED backlight device comprising:

a first substrate having optical transparency and having a first surface and a second surface opposite to said first surface;

an LED thin-film layered structure fixed to said first surface of said first substrate, said LED thin-film layered structure being formed of epitaxially grown inorganic material layers as a P-N junction device;

an anode electrode and a cathode electrode provided on said LED thin-film layered structure;

an anode driver IC and a cathode driver IC for driving said LED thin-film layered structure;

an anode wiring provided on said first surface of said first substrate for electrically connecting said anode driver IC and said anode electrode of said LED thin-film layered structure;

a cathode wiring provided on said first surface of said first substrate for electrically connecting said cathode driver IC and said cathode electrode of said LED thin-film layered structure;

a protrusion provided on a position on said first surface of said first substrate, said position being apart from said LED thin-film layered structure by a certain distance, said protrusion having an inclined surface;

a phosphor provided on said second surface of said first substrate;

a second substrate having optical transparency and having a first surface and a second surface opposite to said first surface, said first surface of said second substrate facing said first surface of said first substrate, and a reflection layer provided on said second surface of said second substrate.

16. The LED backlight device according to claim 15, wherein a concave is formed on said second surface of said second substrate.

17. The LED backlight device according to claim 15, wherein said LED thin-film layered structure is fixed to said first surface of said first substrate by means of intermolecular force, and emits near-ultraviolet rays or ultraviolet rays having the wavelength in the range from 300 nm to 450 nm.

18. The LED backlight device according to claim 15, wherein said phosphor is formed by mixing a phosphor that emits red light having the wavelength in the range from 620 nm to 710 nm when exposed to light having the wavelength in the range from 300 nm to 450 nm, a phosphor that emits green light having the wavelength in the range from 500 nm to 580 nm when exposed to light having the wavelength in the range from 300 nm to 450 nm, a phosphor that emits blue light having the wavelength in the range from 450 nm to 500 nm when exposed to light having the wavelength in the range from 300 nm to 450 nm, and by coating a resultant mixed material.

19. The LED backlight device according to claim 15, wherein said first surface of said first substrate is formed of an organic insulation film or an inorganic insulation film, and is planarized.

20. The LED backlight device according to claim 15, wherein a plurality of said LED thin-film layered structures are formed by epitaxially growing inorganic material layers as a p-n junction device on a sacrificial layer on a base material different from said first substrate, peeling said inorganic material layers from said base material by removing said sacrificial layer using etching, fixing said inorganic material layers to said first surface of said first substrate by means of intermolecular force, and dividing said inorganic material layers into said plurality of LED thin-film layered structures using etching.

21. The LED backlight device according to claim 15, wherein a plurality of said LED thin-film layered structures are disposed at intervals in rows and columns on said first surface of said first substrate.

22. The LED backlight device according to claim 15, wherein a plurality of said LED thin-film layered structures are disposed in columns or rows,
   wherein said anode wiring electrically connects said anode driver IC and said anode electrode of an endmost LED thin-film layered structure of each column or row of said LED thin-film layered structures;
   wherein said cathode wiring electrically connects said cathode driver IC and said cathode electrode of the other endmost LED thin-film layered structure of each column or row of said LED thin-film layered structures, and
   wherein an interconnection wiring connects said LED thin-film layered structures of each column or row in series.

23. An LCD device comprising:
   said LED backlight device according to claim 1, and
   an LCD panel illuminated by said LED backlight device.

24. An LCD device comprising:
   said LED backlight device according to claim 8, and
   an LCD panel illuminated by said LED backlight device.

25. An LCD device comprising:
   said LED backlight device according to claim 15, and
   an LCD panel illuminated by said LED backlight device.

* * * * *